(12) United States Patent
Zhang

(10) Patent No.: US 8,868,593 B1
(45) Date of Patent: Oct. 21, 2014

(54) USER INTERFACE CONTENT VIEW SEARCHING

(75) Inventor: Hongzhen Zhang, Southborough, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/200,139

(22) Filed: Sep. 19, 2011

(51) Int. Cl.
*G06F 17/00* (2006.01)

(52) U.S. Cl.
USPC ............................................... 707/769

(58) Field of Classification Search
USPC ........................................ 707/769, 812, 707
See application file for complete search history.

(56) References Cited

U.S. PATENT DOCUMENTS

| | | | | |
|---|---|---|---|---|
| 7,711,813 | B1* | 5/2010 | Yehuda et al. | 709/224 |
| 2005/0222987 | A1* | 10/2005 | Vadon | 707/3 |
| 2006/0155694 | A1* | 7/2006 | Chowdhury et al. | 707/4 |
| 2007/0124701 | A1* | 5/2007 | Gong et al. | 715/854 |
| 2008/0004992 | A1* | 1/2008 | King et al. | 705/27 |
| 2009/0112881 | A1* | 4/2009 | Kodama | 707/10 |
| 2010/0050131 | A1* | 2/2010 | Weise et al. | 715/853 |
| 2011/0078603 | A1* | 3/2011 | Koomullil | 715/769 |

OTHER PUBLICATIONS

Microsoft Office 2008 for Mac, by Kelley P. Shaffer, Course Technology Cengage Learning, 2010, page 90.*
Ubuntu on a Dime: The Path to Low-Cost Computing written by James Floyd Kelly, page 190, 2009.*
EMC Control Center Enterprise Storage Software, Production Description Guide.*
http://en.wikipedia.org/wiki/Homepage, Sep. 12, 2011, 1 pg.
http://en.wikipedia.org/wiki/Bookmark_(World_Wide_Web), Sep. 13, 2011, 4 pgs.

* cited by examiner

*Primary Examiner* — Robert Beausoliel, Jr.
*Assistant Examiner* — Hau H Hoang
(74) *Attorney, Agent, or Firm* — Muirhead and Saturnelli, LLC

(57) ABSTRACT

Described are techniques for performing a content view search. A hierarchical structure of content views is provided. The content views are registered with an application framework. Query terms are received. The application framework determines nodes in the hierarchical structure having an associated keyword matching the query terms, determines a first list of node identifiers identifying the nodes in the hierarchical structure matching the one or more query terms, and determines a second list of descriptions corresponding to node identifiers of the first list. The second list of descriptions is displayed. Responsive to a selection of a first description from the second list, a first node identifier is determined that corresponds to the selected first description. A first content view for the first node identifier is displayed.

19 Claims, 20 Drawing Sheets

| Registration information 510 | | | |
|---|---|---|---|
| Address or node identifier 512 | Keyword(s) 514 | Description 516 | Descriptor 518 |
| DS1234-> Storage-> LUNs-> LUN A | LUN, LV, Storage device, Logical device, Database Application | Storage for Database Application Device 1 | |
| DS1234-> Storage-> LUNs-> LUN B | LUN, LV, Storage device, Logical device, Database Application | Storage for Database Application Device 2 | |
| DS1234-> Storage-> LUNs-> LUN C | LUN, LV, Storage device, Logical device, Email Application | Storage for Email Application Device 1 | |
| DS1234-> Storage-> LUNs-> LUN D | LUN, LV, Storage device, Logical device, Email Application | Storage for Email Application Device 2 | |
| DS1234-> Systems-> Disconnected Hosts-> North | Host, Server, Unavailable, Disconnected, North, USA, | Disconnected Hosts in USA North | |
| DS1234-> Systems-> Disconnected Hosts-> South | Host, Server, Unavailable, Disconnected, South, USA, | Disconnected Hosts in USA South | |
| DS1234-> Systems-> Disconnected Hosts-> East | Host, Server, Unavailable, Disconnected, East, USA | Disconnected Hosts in USA East | |
| DS1234-> Systems-> Disconnected Hosts-> West | Host, Server, Unavailable, Disconnected, West, USA | Disconnected Hosts in USA West | |
| DS1234->Storage->PD->X | Physical Storage Device | Physical Storage Device X-Flash Drive | |
| DS1234->Storage->PD->Y | Physical Storage Device | Physical Storage Device Y- SATA Disk Drive | |

FIGURE 7

Table 1 630

| Keyword(s) 632 | Address(es) 634 |
|---|---|
| LUN | DS1234-> Storage-> LUNs-> LUN A, DS1234-> Storage-> LUNs-> LUN B<br>DS1234-> Storage-> LUNs-> LUN C, DS1234-> Storage-> LUNs-> LUN D |
| LV | DS1234-> Storage-> LUNs-> LUN A, DS1234-> Storage-> LUNs-> LUN B<br>DS1234-> Storage-> LUNs-> LUN C, DS1234-> Storage-> LUNs-> LUN D |
| Storage Device | DS1234-> Storage-> LUNs-> LUN A, DS1234-> Storage-> LUNs-> LUN B<br>DS1234-> Storage-> LUNs-> LUN C, DS1234-> Storage-> LUNs-> LUN D |
| Logical Device | DS1234-> Storage-> LUNs-> LUN A, DS1234-> Storage-> LUNs-> LUN B<br>DS1234-> Storage-> LUNs-> LUN C, DS1234-> Storage-> LUNs-> LUN D |
| Database Application | DS1234-> Storage-> LUNs-> LUN A, DS1234-> Storage-> LUNs-> LUN B |
| Email Application | DS1234-> Storage-> LUNs-> LUN C, DS1234-> Storage-> LUNs-> LUN D |
| Hosts | DS1234-> Systems->Disconnected Hosts->North, DS1234-> Systems->Disconnected Hosts->South<br>DS1234-> Systems->Disconnected Hosts->East, DS1234-> Systems->Disconnected Hosts->West<br>DS1234-> Systems->Hosts ALL->North, DS1234-> Systems-> Hosts ALL->South<br>DS1234-> Systems->Hosts ALL->East, DS1234-> Systems->Hosts ALL->West |
| Server | DS1234-> Systems->Disconnected Hosts->North, DS1234-> Systems->Disconnected Hosts->South<br>DS1234-> Systems->Disconnected Hosts->East, DS1234-> Systems->Disconnected Hosts->West<br>DS1234-> Systems->Hosts ALL->North, DS1234-> Systems-> Hosts ALL->South<br>DS1234-> Systems->Hosts ALL->East, DS1234-> Systems->Hosts ALL->West |
| Unavailable | DS1234-> Systems->Disconnected Hosts->North, DS1234-> Systems->Disconnected Hosts->South<br>DS1234-> Systems->Disconnected Hosts->East, DS1234-> Systems->Disconnected Hosts->West<br>DS1234-> Systems->Hosts ALL->North, DS1234-> Systems-> Hosts ALL->South<br>DS1234-> Systems->Hosts ALL->East, DS1234-> Systems->Hosts ALL->West |
| Disconnected | DS1234-> Systems->Disconnected Hosts->North, DS1234-> Systems->Disconnected Hosts->South<br>DS1234-> Systems->Disconnected Hosts->East, DS1234-> Systems->Disconnected Hosts->West<br>DS1234-> Systems->Hosts ALL->North, DS1234-> Systems-> Hosts ALL->South<br>DS1234-> Systems->Hosts ALL->East, DS1234-> Systems->Hosts ALL->West |

FIGURE 8A

Table 1 630

| Keyword(s) 632 | Address(es) 634 |
|---|---|
| USA | DS1234-> Systems->Disconnected Hosts->North, DS1234-> Systems->Disconnected Hosts->South, DS1234-> Systems->Disconnected Hosts->East, DS1234-> Systems->Disconnected Hosts->West, DS1234-> Systems-> Hosts ALL->North, DS1234-> Systems-> Hosts ALL->South, DS1234-> Systems->Hosts ALL->East, DS1234-> Systems->Hosts ALL->West |
| North | DS1234-> Systems->Disconnected Hosts->North, DS1234-> Systems-> Hosts ALL->North |
| South | DS1234-> Systems->Disconnected Hosts->South, DS1234-> Systems->Hosts ALL->South |
| East | DS1234-> Systems->Disconnected Hosts->East, DS1234-> Systems->Hosts ALL->East |
| West | DS1234-> Systems->Disconnected Hosts->West, DS1234-> Systems->Hosts ALL->West |
| Physical Storage Device | DS1234->Storage->PD->X , DS1234->Storage->PD->Y |

FIGURE 8B

| Address or node identifier 712 | Description 714 | Descriptor 716 |
|---|---|---|
| DS1234--> Storage--> LUNs--> LUN A | Storage for Database Application Device 1 | |
| DS1234--> Storage--> LUNs--> LUN B | Storage for Database Application Device 2 | |
| DS1234--> Storage--> LUNs--> LUN C | Storage for Email Application Device 1 | |
| DS1234--> Storage--> LUNs--> LUN D | Storage for Email Application Device 2 | |
| DS1234--> Systems--> Disconnected Hosts-->North | Disconnected Hosts in USA North | |
| DS1234--> Systems--> Disconnected Hosts-->South | Disconnected Hosts in USA South | |
| DS1234--> Systems--> Disconnected Hosts-->East | Disconnected Hosts in USA East | |
| DS1234--> Systems--> Disconnected Hosts-->West | Disconnected Hosts in USA West | |
| DS1234-->Storage->PD->X | Physical Device X – Flash Drive | |
| DS1234-->Storage->PD->Y | Physical Device Y – SATA Disk Drive | |
| .. .. | | |

Table 2 710

FIGURE 9

USER INTERFACE CONTENT VIEW SEARCHING

BACKGROUND

1. Technical Field

This application relates to techniques used in connection with user interface content views.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In connection with data storage systems, or more generally any type of system, a user may perform a search of data included in a database, file, or other data container, where the data container may have its associated data stored on storage devices. For example, in connection with a database containing records, a user may enter search query terms. Database software may search the database records for text matches between the query terms and content of the data base records. The database software may then output a list of records, or portions thereof, having content that matches the text of the user's query terms.

SUMMARY OF THE INVENTION

In accordance with one aspect of the invention is a method of performing a content view search comprising: providing a hierarchical structure of content views; registering the content views with an application framework; receiving one or more query terms; determining, by the application framework, one or more nodes in the hierarchical structure having an associated keyword matching the one or more query terms; determining, by the application framework, a first list of one or more node identifiers identifying the one or more nodes in the hierarchical structure matching the one or more query terms; determining, by the application framework, a second list of one or more descriptions, wherein said second list includes a description for each node identifier in said first list; displaying the second list of descriptions; responsive to a selection of a first description from the second list, determining a first node identifier corresponding to the selected first description; and displaying a first content view for the first node identifier. The hierarchical structure may include a plurality of nodes. Each of the plurality of nodes may represent a content view for a user interface display. Each of the plurality of nodes may be associated with first information including information identifying content and describing how to represent the content on the user interface display. The step of registering may include providing registration information to the application framework describing the hierarchical structure and plurality of instances of the first information associated with the plurality of nodes. The registration information may also include a description and a set of one or more keywords associated with each of said plurality of nodes. The step of determining one or more nodes in the hierarchical structure having an associated keyword matching the one or more query terms may use the registration information. The first list and the second list may be determined by the application framework using the registration information. The method may also include associating the first node identifier with a bookmark for a first user. The method may also include displaying a first icon associated with the bookmark; and displaying, in response to selecting the first icon, the first content view. The method may further include associating the first identifier with a home page for a first user, wherein, the first content view is automatically displayed as an initial user interface display for the first user in response to the first user executing an application, the application including user interface displays of content views represented by the hierarchical structure. A first set of one or more keywords may be associated with the first node identifier for a first of the plurality of nodes in the hierarchical structure. Each of the keywords in the first set may not be included in the first description for the first node and may not be included in a content view for the first node. The first description may be included in the second list and displayed and selected by a user. The application framework may include a search service that creates two tables using the registration information. A first of the two tables may identify, for each keyword associated with one of the nodes in the hierarchical structure, a first node identifier list identifying one or more nodes in the hierarchical structure. Each of the one or more nodes in the first node identifier list may be associated with said each keyword, and a second of the two tables may identify, for each node in the hierarchical structure, a description associated with said each node. The second table may include an entry for each node in the hierarchical structure. The first table may include at least one entry identifying a keyword associated with a plurality of nodes in the hierarchical structure. The hierarchical structure may include a plurality of nodes forming a tree having a root node and one or more descendant nodes of the root node. The tree may include a plurality of levels including a first level for the root node, a second level of nodes which are children or direct descendant nodes of the root node and a third level of nodes, said third level of nodes being children or direct descendant nodes of the second level of nodes. The first information for each node of the first level and each node of the second level having children at the third level may include child node information identifying one or more child nodes of said each node. A second node at the second level may have the child node information. The child node information may be displayed as part of a second content view of the second node. The first information may identify how to display the child node information in a user interface display. The first information may indicate to display the child node information as any of a user interface menu item for selection, a user interface button for selection and a user interface tab for selection. The hierarchical structure may define an application workflow.

In accordance with another aspect of the invention is a computer readable medium comprising code stored thereon for performing a content view search, the computer readable medium comprising code for: providing a hierarchical structure of content views; registering the content views with an application framework; receiving one or more query terms; determining, by the application framework, one or more nodes in the hierarchical structure having an associated keyword matching the one or more query terms; determining, by the application framework, a first list of one or more node identifiers identifying the one or more nodes in the hierarchical structure matching the one or more query terms; determining, by the application framework, a second list of one or more descriptions, wherein said second list includes a description for each node identifier in said first list; displaying the second list of descriptions; responsive to a selection of a first description from the second list, determining a first node identifier corresponding to the selected first description; and displaying a first content view for the first node identifier. The hierarchical structure may include a plurality of nodes. Each of the plurality of nodes may represent a content view for a user interface display and may be associated with first information including information identifying content and describing how to represent the content on the user interface display. The code for registering may include code for providing registration information to the application framework describing the hierarchical structure and plurality of instances of the first information associated with the plurality of nodes, said registration information also including a description and a set of one or more keywords associated with each of said plurality of nodes.

BRIEF DESCRIPTION OF THE DRAWINGS

Features and advantages of the present invention will become more apparent from the following detailed description of exemplary embodiments thereof taken in conjunction with the accompanying drawings in which:

FIG. 7 is an example representation of registration information that may be used in an embodiment in accordance with techniques herein;

FIGS. 8A, 8B and 9 are example representations of tables that may be used by a content view search service in an embodiment in accordance with techniques herein.

DETAILED DESCRIPTION OF EMBODIMENT(S)

Figure 1:
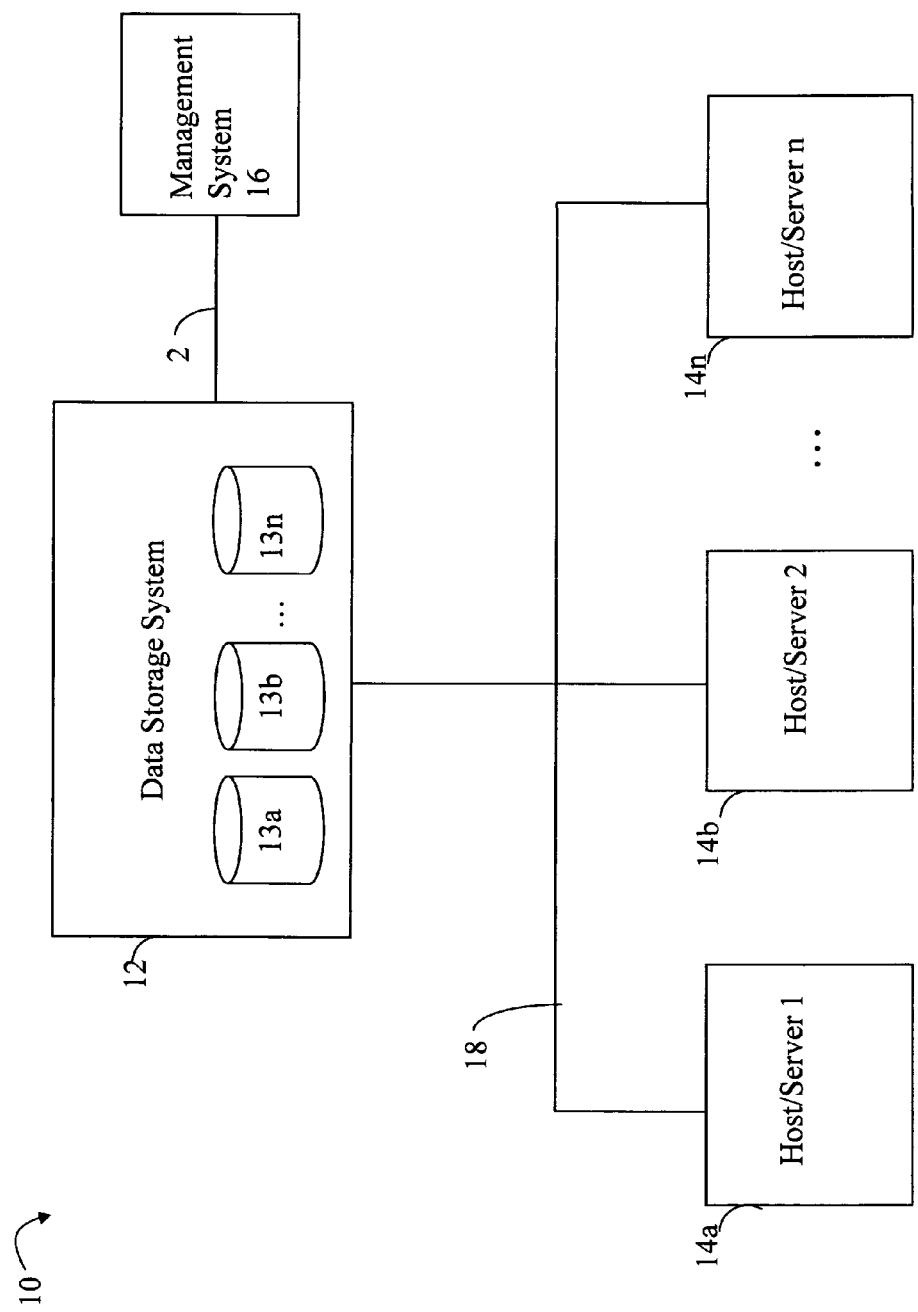
FIG. 1 is an example of an embodiments of a system that may utilize the techniques described herein.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 2 may be a LAN connection and the communication medium 18 may be an iSCSI or fibre channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 13a-13n, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

Figure 2:
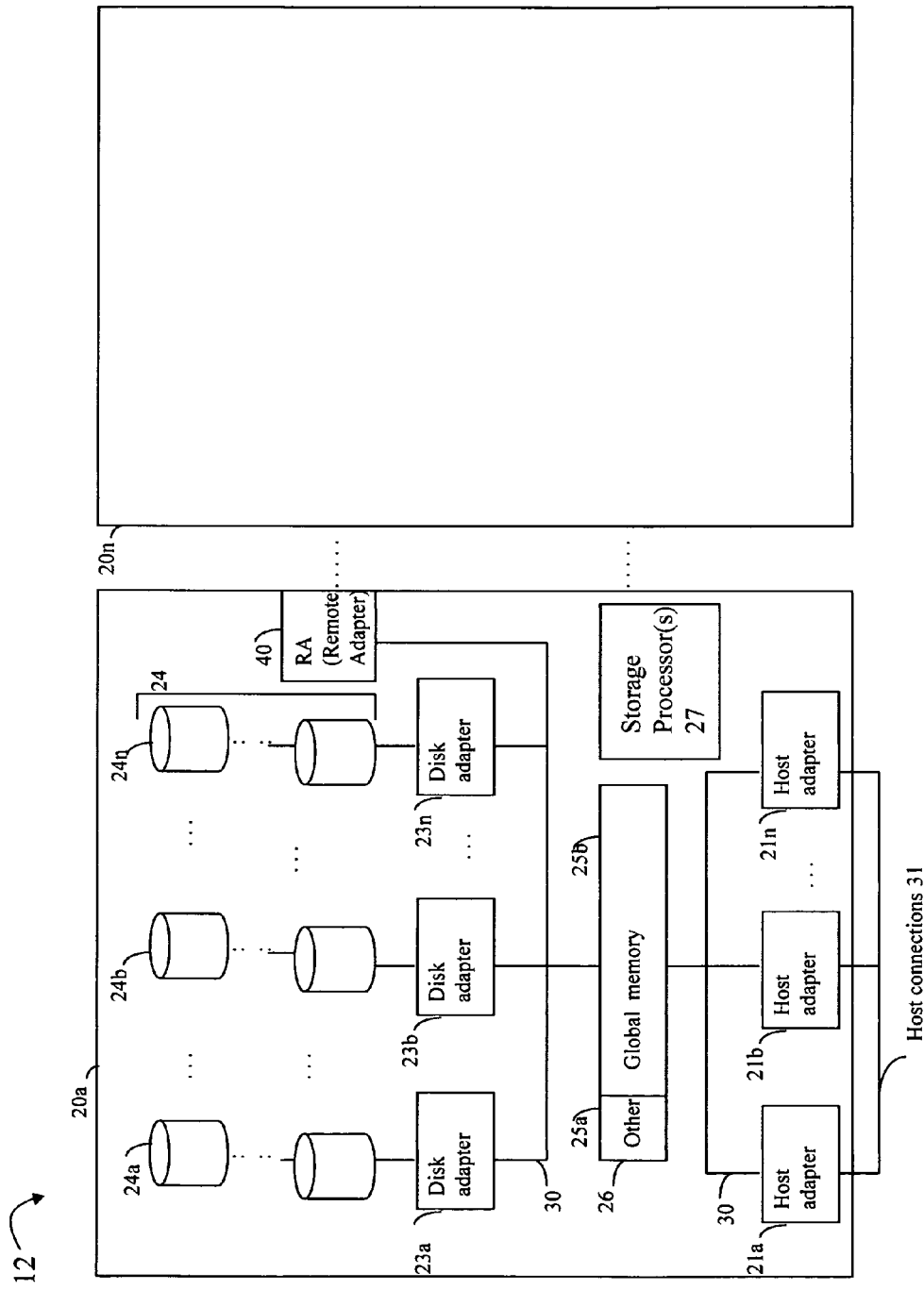
FIG. 2 is an example illustrating details of a data storage system in accordance with techniques herein.

Referring to FIG. 2, shown is an example of an embodiment of the data storage system 12 that may be included in the system 10 of FIG. 1. Included in the data storage system 12 of FIG. 2 are one or more data storage systems 20a-20n as may be manufactured by one or more different vendors. Each of the data storage systems 20a-20n may be a data storage array inter-connected (not shown) to other data storage array(s). Additionally, as noted above, the data storage systems may also be connected to the host systems through any one or more communication connections 31. In this example as described in more detail in following paragraphs, reference is made to the more detailed view of element 20a. It should be noted that a similar more detailed description may also apply to any one or more of the other elements, such as 20n, but have been omitted for simplicity of explanation.

Each of the data storage systems, such as 20a, may include a plurality of storage devices such as disk devices or volumes included in an arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA.

The system 20a may also include one or more storage processors 27. Each of the storage processors 27 may be CPU and an embodiment may include any number of such processors. For example, the CLARiiON® data storage system by EMC Corporation includes two storage processors. The system 20a may also include one or more host adapters ("HAs") or directors 21a-21n. Each of the HAs may be used to manage communications and data operations between one or more host systems and the global memory. In an embodiment, the HA may be a Fibre Channel Adapter (FA) or other adapter which facilitates host communication. The HA communicates with a component of the host such as a host bus adapter (HBA). Generally, directors may also be characterized as the different adapters, such as HAs (including FAs), DAs RAs and the like, as described herein. Components of the data storage system, such as an HA, which may communicate with a host may also be referred to as front end components. Within the data storage system, components, which may be characterized as backend components, communicate with a front end component. An example of a backend component is a DA. In connection with data storage systems such as by EMC Corporation, various types of directors or adapters may be implemented as a processor, or, more generally, a component that includes the processor. Examples of directors are disk adapters (DAs), host adapters (HAs), and the like.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

In connection with a data storage system, system management may be performed using software installed, for example, on a management system 16. The software may be used in connection with techniques herein to search for and display a content view of interest to a user. For example, the user may be interested in listing information about particular data storage systems, devices, and the like. In connection with techniques herein, the user may search for one or more content views of interest which are displayed on a user interface (UI). One application or use of such techniques may provide for bookmarking each of the one or more content views allowing a user to automatically navigate to such bookmarked content views upon selection of a predefined bookmark rather than, for example, manually navigating through a series of UI menus and making selections therefrom. As described in more detail below, the user may rather search for a content view of interest at a first point in time based on one or more keywords associated with the content view matching query terms. The content view may then be marked such as with a bookmark denoting the address of the selected content view in a bookmark list of customized selected content views for the particular user. At a later point in time, the user may select a bookmark from the list and the associated content view may be displayed. In a similar manner, a selected content view may be associated with a homepage marker for a particular user so that each time the user logs into the software, the content view associated with the homepage marker may be displayed.

Although following paragraphs may provide exemplary uses of techniques herein with data storage management, it will be appreciated by those skilled in the art that techniques herein have broader use and applicability, more generally, with any type of UI having associated content views displayed. For example, techniques herein may be generally used with any application having a UI with a workflow reflected in connection with a series UI elements (e.g., such as menus, tabs, buttons, data input fields, and the like), the different user responses and selections, and the resulting UI content views displayed in response to such various user inputs and selections from such UI elements. The foregoing may be represented in a hierarchal manner of different UI content views displayed in response to user inputs and/or selections for displayed UI elements.

A content view may be characterized as what data or content is displayed and how such data is represented in connection with a UI at a point in time. The data or content may include, for example, a list of detailed information about a single host or single LUN. Depending on the particular detailed information, the list of detailed information may be displayed on the UI in any one of a variety of different UI elements or structures such as a table, chart, graph, menu list, and the like. Further a particular UI element, such as a menu or selection button may further be represented in different ways based on other attributes. For example, a menu may be a drop down menu, or the menu items may rather be displayed as a set of tabs. A table may have different display options related to spacing, sizes, borders, whether text is bolded or in a particular font, and the like. A displayed UI element in a first content view, when selected, may also provide a link to another second UI content view. Collectively, such information regarding the data or content and how to display or visually represent the content on a UI display may be referred to as a content view. Each different UI displayed, such as in response to a menu selection, may be characterized as having its own UI content view. As such, the series of UI displays in response to selecting a sequence of one or more UI elements (e.g., in response to a selection, button selection, and the like) may be represented as a work flow or path originating from the first UI display. Each node in the path corresponds to a UI display or a UI content view. The possible paths, where each node in a path has a corresponding UI content view, may be represented in a hierarchical structure such as a tree.

Figure 3:
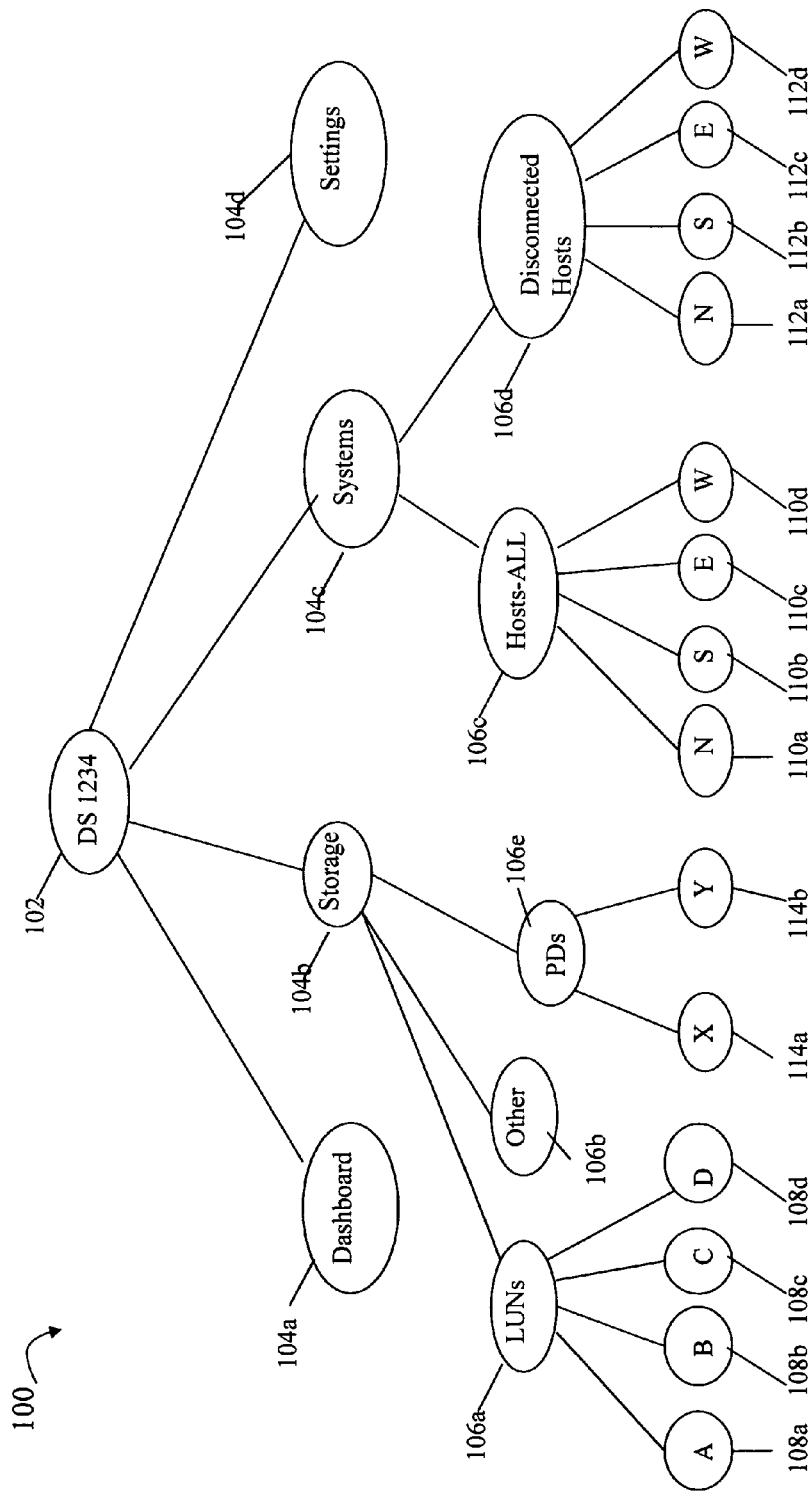
FIG. 3 is an example representation of a hierarchical structure of UI content views that may be used in connection with an embodiment in accordance with techniques herein.

Referring to FIG. 3, shown is an example of a hierarchical structure of UI content views as may be used in an embodiment in accordance with techniques herein. The example 100 includes a plurality of levels of nodes including a first level with a single node 102, a second level of nodes 104a-104d, a third level of nodes 106a-106e, and a fourth level of nodes 108a-108d, 114a-114b, 110a-110d, and 112a-112d. The example 100 illustrates that the hierarchical structure may form a tree although the techniques herein are not restricted to such a tree representation. As know in the art, the tree of 100 may refer to the level 1 node as the root of the tree having child nodes 104a-104d. Each of the foregoing child nodes 104a-104d may optionally have one or more of its own child nodes and so on for each level. Child nodes, and more generally, any node at a higher level having a path to a first node at a lower level (e.g., higher up or closer to the root node), may be referred to as descendant nodes of the first node. For example, all nodes in the example 100 other than 102 are descendant nodes of node 102, nodes 104a, 104d and 106b each have no descendant nodes, nodes 110a-110d are descendant nodes and also child nodes of 106c, and the like. If a node does not have any descendant nodes, that node may also be referred to as a leaf node. Each node in the tree has its own UI content view so that the example 100 may represent a hierarchy of all possible UI selections and associated content views. Furthermore, a particular node in the tree may be uniquely identified by the path from the root node leading to that node. For example, the path to node 114a may be represented as 102. 104b. 106e. 114a, where each item in the path represents an address or identifier of a node in the tree. Thus, to display the content view represented by node 114a, the user must select menu options or other UI elements (e.g., drill down a list of menus or UI element selections) by selecting a first item from the content view for node 102, selecting a second item from the content view for node 104b, and then selecting a third item from the content view for node 106e. Leaf nodes, such as 114a, have no links to other content views as represented by the fact that there is no further link in the example 100 to another node in the tree.

The example 100 may represent a hierarchical structure of UI content views in connection with a data storage management application that displays content views about different aspects of a single data storage system, such as a data storage array. In this example, node 102 may represent the first level content view of the data storage system denoted as "DS 1234". Included in this first content view may be four buttons providing links to other content views corresponding to dashboard 104a, storage 104b, system 104c and settings 104d.

The content view of node storage 104b may include three buttons providing links to other content views corresponding to LUNs 106a, other 106b and PDs (physical storage devices) 106e.

The content view of node LUNs 106a may include three buttons providing links to other content views corresponding to LUN A 108a, LUN B 108b, LUN C 108c, and LUN D 108d. The content view of node PDs 106e may include two buttons providing links to other content views corresponding to physical device X 114a and physical device Y 114b. The content view of node systems 104c may include two buttons providing links to other content views corresponding to hosts-ALL 106c and disconnected hosts 106d. The content view of node hosts-ALL 106c may include four providing links to other content views corresponding to north (N) 110a, south (S) 112b, east (E) 110c and west (W) 110d. The content view of node hosts-disconnected 106d may include four providing links to other content views corresponding to north (N) 112a, south (S) 112b, east (E) 112c and west (W) 112d. In connection with an address or location of a node in the hierarchy as denoted by a path to the node, the path (corresponding to the node's address or unique identifier) may also be represented herein based on the names or semantic symbols (e.g., the text description encircled within each node such as "DS 1234 for node 102, "Dashboard" for node 104a). Thus a path represented the unique node identifier or address in the hierarchy for node 106a may be represented as DS1234→Storage→LUNs.

In connection with the example 100, the content view of storage 104b may be selected for viewing if a user wants to know additional information about different storage aspects of the data storage system DS 1234. If a user wants to view information on a particular LUN, the user navigates to content view 106a and then to one of the content views 108a-108d depending on which LUN A-D is of interest to the user. The content view of storage 104c may be selected for viewing if a user wants to know additional information about different hosts connected to, or able to access storage devices of, the data storage system DS 1234. The hosts systems in this example may include a first group of all hosts able to access storage of DS 1234 and a second group of hosts which are currently disconnected from the data storage system. Hosts in the first group may be defined in accordance with a system configuration. Hosts in the second group may be a subset of 0 or more hosts of the first group depending on which hosts at a point in time are disconnected or otherwise unable to access the data storage system. A host may be disconnected and thereby included in a list of disconnected hosts, for example, if communications between the host and data storage system DS 1234 are down, if the host is offline, and the like. Each of the groups of ALL hosts and disconnected hosts may be further categorized based on a US geographical region of north, south east and west. If a user wants to view information of all hosts configured to access DS 1234, the user navigates to content view 106c and then to one of the content views 110-110d depending on which US geographic region includes hosts of interest. In a similar manner, if a user wants to view information of disconnected hosts (hosts configured to access DS 1234 but current not in communication with the DS 1234), the user navigates to content view 106d and then to one of the content views 112a-112d depending on which US geographic region includes the disconnected hosts of interest.

Based on the foregoing, the hierarchical structure of UI content views represents different UI navigation paths or workflows and reflects UI menu structure for the data storage management application.

It should be noted that the number of levels, nodes at each level, and the like, as provided in the example of FIG. 3 for purposes of illustration of techniques herein should not be construed as a limitation. More generally, the hierarchical structure used in an embodiment in accordance with techniques herein may include any suitable number of levels, nodes per level, and the like.

What will now be presented are different UI content views as represented by portions of the foregoing hierarchical structure.

Figure 4A:
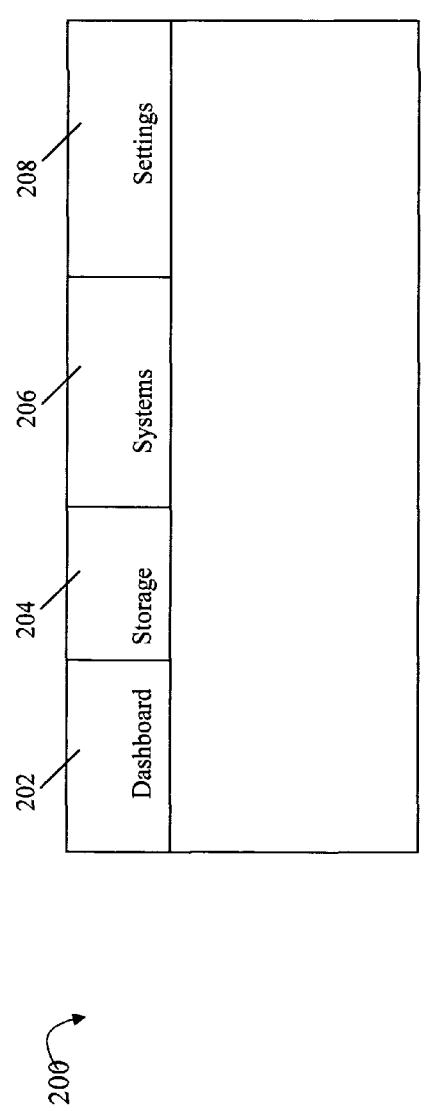
FIGS. 4A-4D, 5A-5E, 10, 11, 12 and 13 are examples of UI displays that may be used in an embodiment in connection with techniques herein.
Figure 4B:
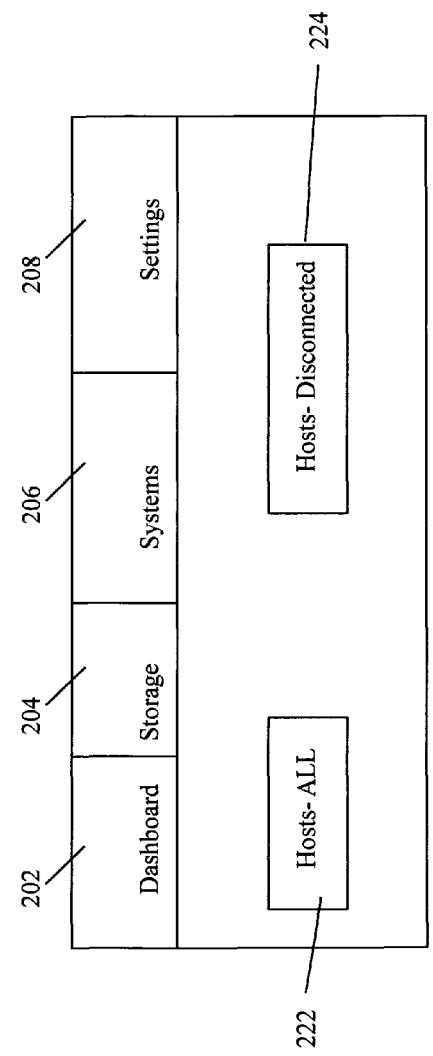
Figure 4C:
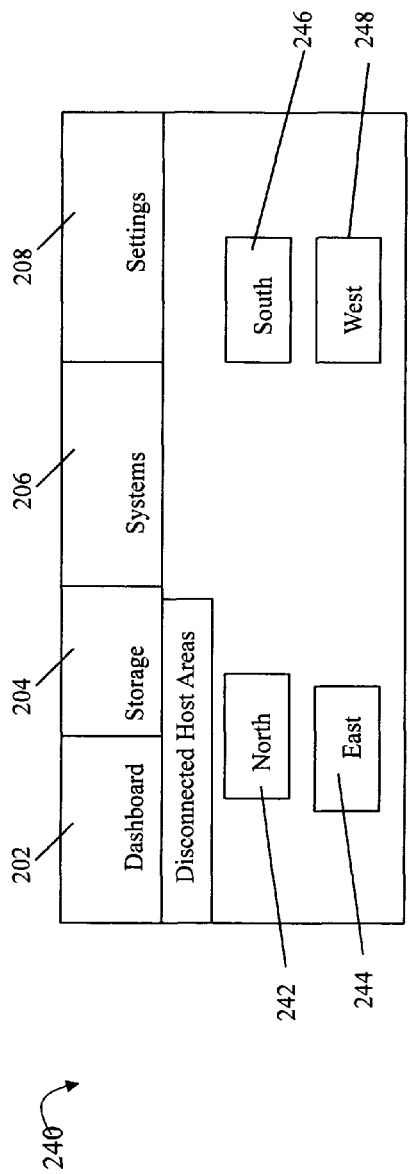
Figure 4D:
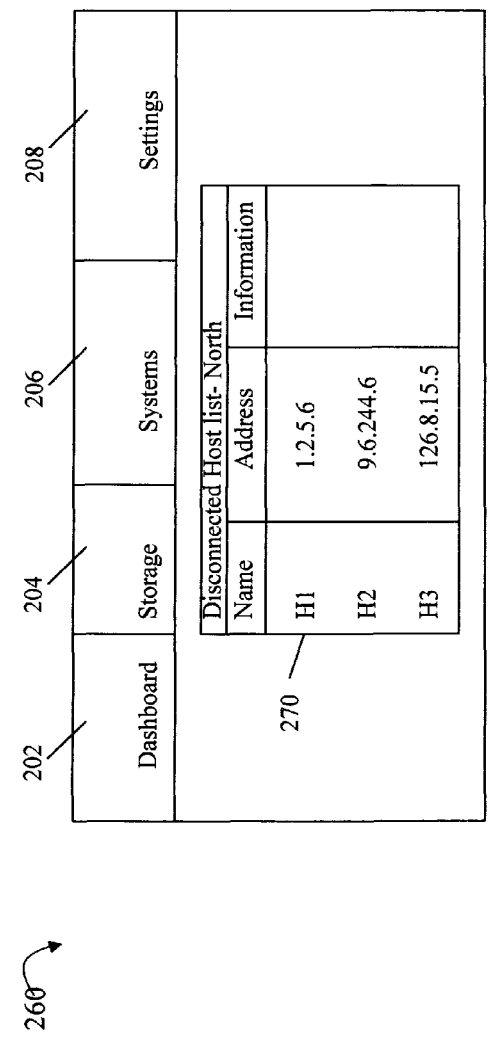

Referring to FIG. 4A, shown is an example 200 of a content view that may be initially displayed to a user when starting the data storage management application for the data storage system, DS 1234. The example 200 represents the content view corresponding to node 102 of FIG. 3. The example 200 may include UI elements 202, 204 206 and 208 providing links, respectively, to other content views corresponding to node 102's four child nodes 104a-104d. A user may select 206 of FIG. 4A resulting in navigation to another UI content view as represented by FIG. 4B. The example 220 of FIG. 4B represents the content view corresponding to node 104c of FIG. 3. The example 220 may include UI elements 222 and 224 providing links, respectively, to other content views corresponding to node 104c's two child nodes 106c and 106d. A user may select 224 of FIG. 4B resulting in navigation to another UI content view as represented by FIG. 4C. The example 240 of FIG. 4C represents the content view corresponding to node 106d of FIG. 3. The example 240 may include UI elements 242, 244, 246 and 248 providing links, respectively, to other content views corresponding to node 106d's child nodes 112a-112d. A user may select 242 of FIG. 4C resulting in navigation to another UI content view as represented by FIG. 4D. The example 260 of FIG. 4D represents the content view corresponding to node 112a of FIG. 3. The example 260 may include no UI elements providing links to other content views since, as represented in FIG. 3, node 106d is a leaf node having no child nodes. The UI content view of the example 260 may provide detailed information in a list or tabular format of currently disconnected hosts which are located in the US northern geographic region. As noted elsewhere herein, the path identifying the node in the hierarchical structure of FIG. 3 may be represented as DS 1234→Systems→Disconnected Hosts→North, or 102.104c. 106d. 110a. The foregoing path may serve as a unique identifier, address or location of a node in the hierarchical structure. As described elsewhere herein, using this unique identifier, content view information describing the content view for a node may be retrieved.

Figure 5A:
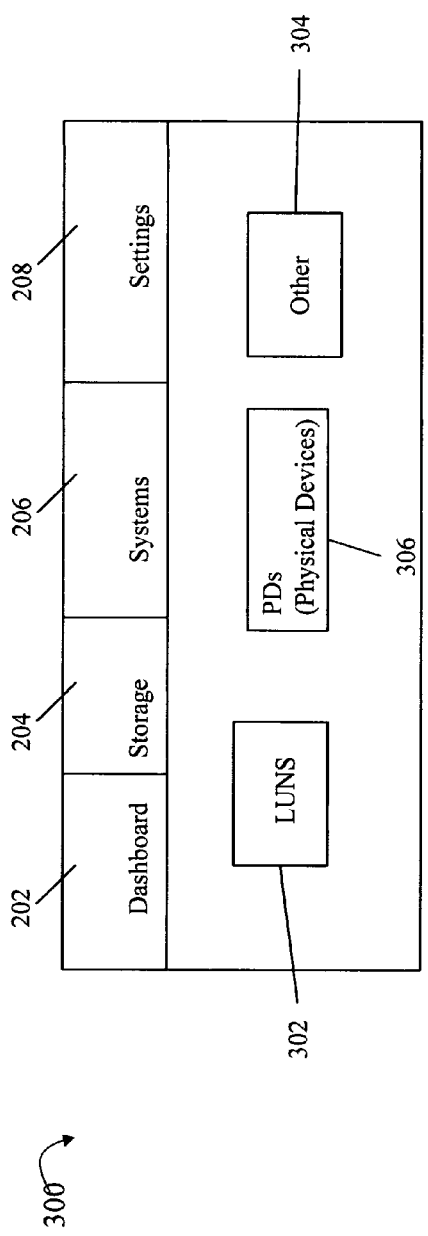
Figure 5B:
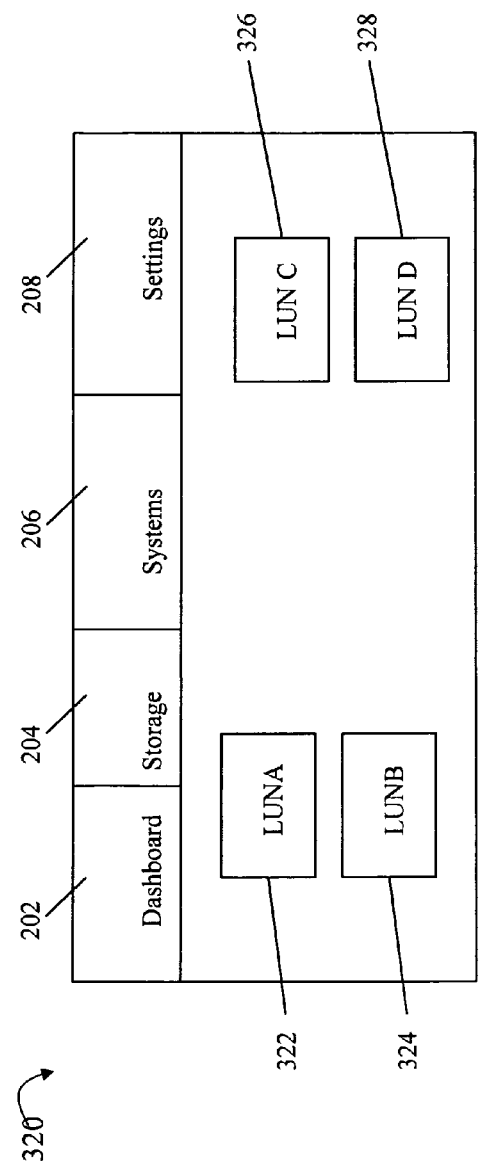
Figure 5C:
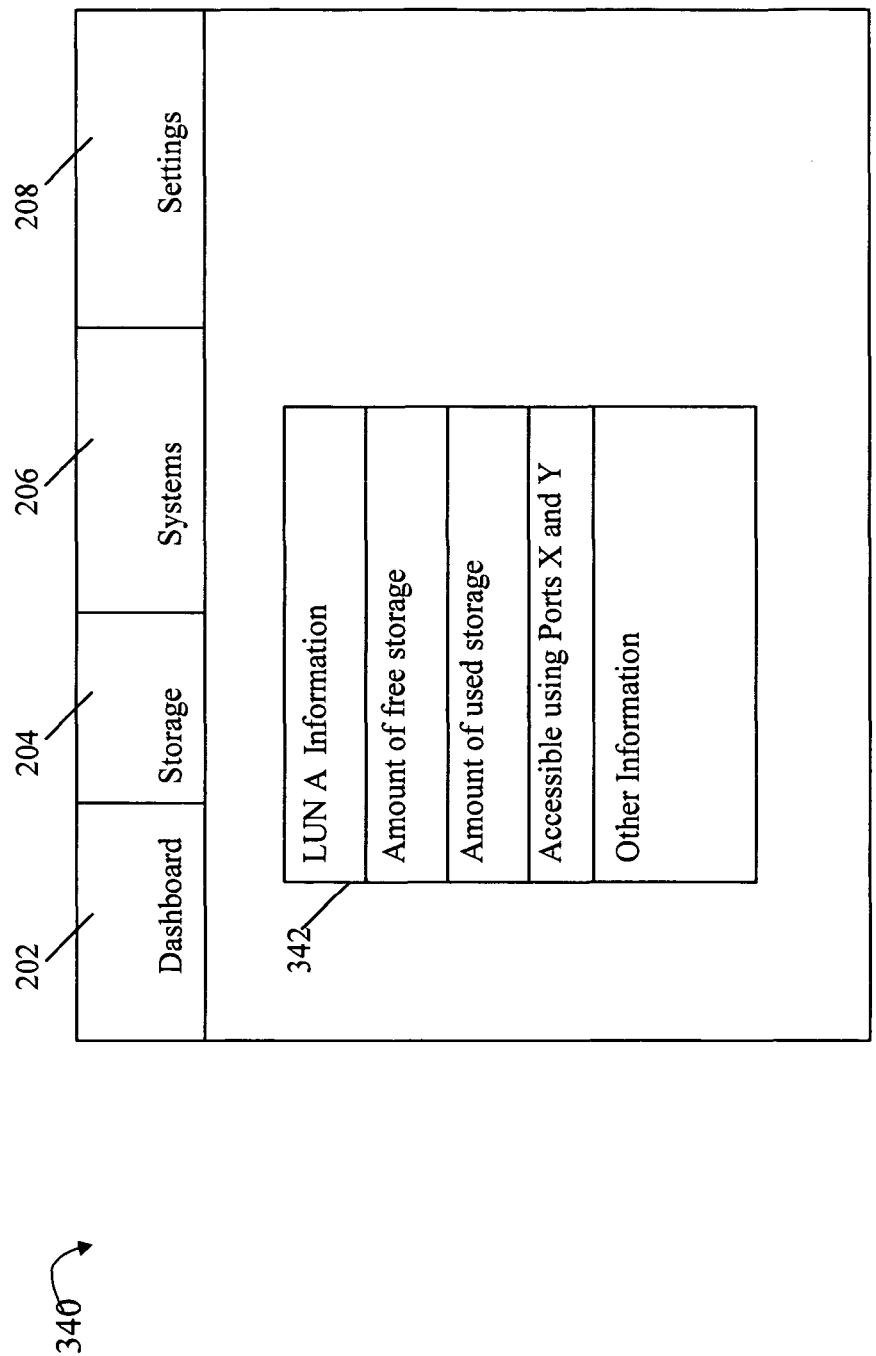

With reference back to FIG. 4A, a user may select 204 storage of FIG. 4A resulting in navigation to another UI content view as represented by FIG. 5A. The example 300 of FIG. 5A represents the content view corresponding to node 104b of FIG. 3. The example 300 may include UI elements 302, 304 and 306 providing links, respectively, to other content views corresponding to node 104b's child nodes 106a, 106b and 106e. A user may select 302 of FIG. 5A resulting in navigation to another UI content view as represented by FIG. 5B. The example 320 of FIG. 5B represents the content view corresponding to node 106a of FIG. 3. The example 320 may include UI elements providing links, respectively, to other content views corresponding to node 106a's child nodes 108a-108d. A user may select 322 of FIG. 5B resulting in navigation to another UI content view as represented by FIG. 5C. The example 340 of FIG. 5C represents the content view corresponding to node 108a of FIG. 3. The example 340 may include no UI elements providing links to other content views since, as represented in FIG. 3, node 108a is a leaf node having no child nodes. The UI content view of the example 340 may provide detailed information in a list or tabular format regarding LUN A.

Figure 5D:
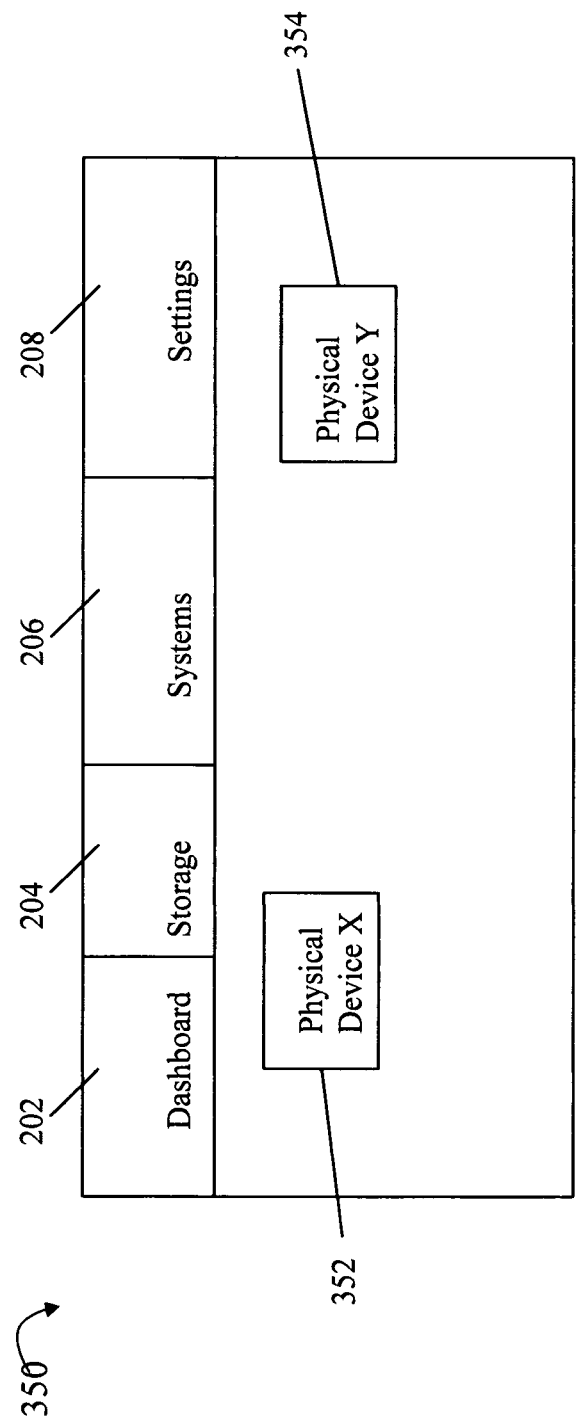
Figure 13:
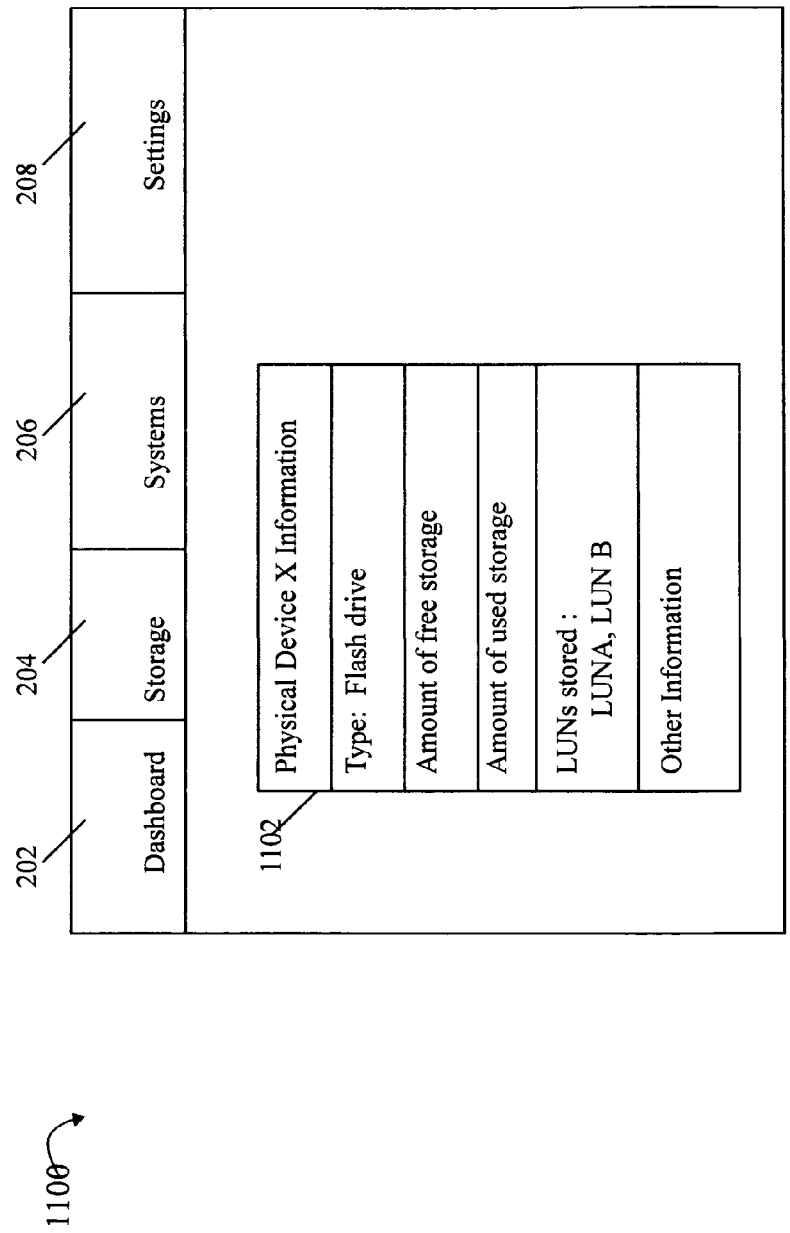

The foregoing are some examples of content views displayed in connection with a user navigating to various locations via UI menu selections in accordance with the hierarchical structure of FIG. 3. With reference back to FIG. 5A, it should be noted that the user may similarly select item 306 providing for display of a content view for node 106*e* as represented in FIG. 5D. A user may select 352 of FIG. 5D resulting in navigation to another UI content view as represented by FIG. 13. The example 350 of FIG. 5D represents the content view corresponding to node 106*e* of FIG. 3. The example 350 may include UI elements providing links, respectively, to other content views corresponding to node 106*e*'s child nodes 114*a*, 114*b*. A user may select 352 of FIG. 5D resulting in navigation to another UI content view as represented by FIG. 13. The example 1100 of FIG. 13 represents the content view corresponding to node 114*a* of FIG. 3. The example 1100 of FIG. 13 may include no UI elements providing links to other content views since, as represented in FIG. 3, node 114*a* is a leaf node having no child nodes. The UI content view of the example 1100 may provide detailed information in a list or tabular format regarding the selected physical device (PD) X.

In a manner similar to that as illustrated and described above with respect to a particular LUN, physical device, geographical grouping of hosts, and the like, a user may navigate via UI element selections to various content views corresponding to nodes in the hierarchical structure to display desired information.

Figure 5E:
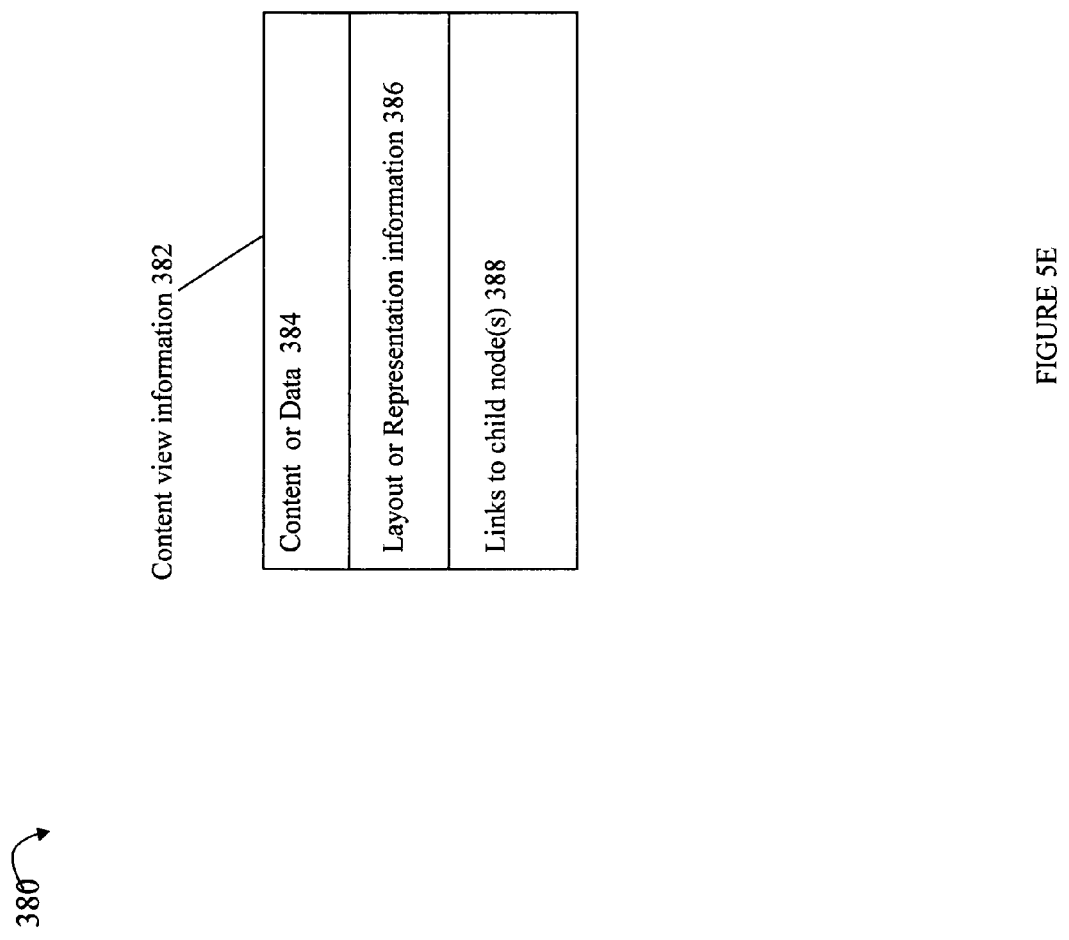

Referring to FIG. 5E, shown is an example illustrating content view information as may be maintained for each content view represented by a node in the hierarchical structure of FIG. 3 in an embodiment in accordance with techniques herein. The example 380 illustrates that content view information 382 for a single content view may include content or data 384, layout or representation information 386 and links to child node(s) 388. The content view information for a node may include any one or more of the foregoing types of information. The content or data 384 may include the data or otherwise identify how to obtain the data or content to be represented in the UI display as described by 386. For example, 384 may identify a file, database record or table, specify a database query, and the like, use to obtain a set of data such as the detailed LUN information illustrated in connection with FIG. 5C. Element 386 may identify aspects about how to layout or represent the data visually. For example, element 386 may identify whether the data is to be displayed in a graph or a table, describe table attributes (e.g., table format, headers, header labels, border information, number of rows and columns, what is bolded or italicized, identify a font), and the like. Element 388 may identify the child nodes, if any, of the node having the content view currently described the content view information 382. Element 388 may include, for example, a text description of each child node and describe how to visually represent the description for each child node as a UI element. For example, element 388 may indicate that the child nodes are to be displayed as buttons, in a drop down or other menu list, and the like. In response to selection of one of the UI elements for a child node, the user is navigated to another content view of the child node for display on the UI. Element 388 may provide a link or mapping for each child node where the mapping maps each child node's UI element to a node address in the hierarchical structure, corresponding to each child node's content view. With use of the information of 388, each node has knowledge about or a definition of its child nodes as part of the content view information. As described herein, each child node corresponds to another view level of the current node described by 380. The current node view, as a parent node, may include a "link" (e.g., button or other item in UI display from which the user may select) to each child node corresponding to a lower level content view.

In connection with the techniques herein, the unique identifier for each node in the hierarchical structure may be used to map to, or otherwise identify, a descriptor, such as an object, including the content view information. In connection with the hierarchical structure such as described above in connection with FIG. 3, it should be noted that a first node having a first content view may inherit aspects of its content view from any of its ancestor nodes (e.g., such as parent and grandparent nodes from any preceding level in the hierarchy on a same path as the first node). For example, with reference to FIG. 4B, aspects of the UI content view of node 104*c* illustrated by 220 inherits aspects or displayed items from its parent node, the root node 102 having a content view as in FIG. 4A. In particular, for a particular path leading to the first node, the first content view for the first node may inherit aspects of the content view from its parent node's content view which are not modified or overridden by aspects of the first content view. For example, the content view of FIG. 4B includes tabs 202, 204 206 and 208 of its parent node as displayed in FIG. 4A. Generally, the UI display may be updated as a user navigates or moves down the tree on a path to a higher level node thereby having any first node possibly modify or override content view aspects of its parent, whereby its parent may have modified or overridden content view aspects of its own parent (e.g., grandparent to the first node), and so on. Thus, due to the numerous possible levels in the hierarchy, a first node at a first level may inherit and/or modify aspects of the content view from a second node (its parent node), whereby the second node may inherit and/or modify aspects of the content view from a third node, the second node's parent, and so on in a repetitive or recursive manner. In connection with techniques herein, all content views of the hierarchical structure are searchable.

In an embodiment in accordance with techniques herein, an application developer may provide a hierarchical structure description as illustrated in connection with FIG. 3. The hierarchy may represent the workflow of the application UI hierarchy. The developer may also define the content view information for each node in the hierarchy as illustrated in connection with FIG. 5E. The foregoing hierarchical structure and content view information may be predefined or specified prior to writing code for the application as part of defining the application workflow and associated UI structure thereby facilitating application development which is built on a framework of different software components. The developer may provide the hierarchical structure description and content view information for each node for use with an application framework providing functionality for performing UI content view searches as will now be described.

Figure 6:
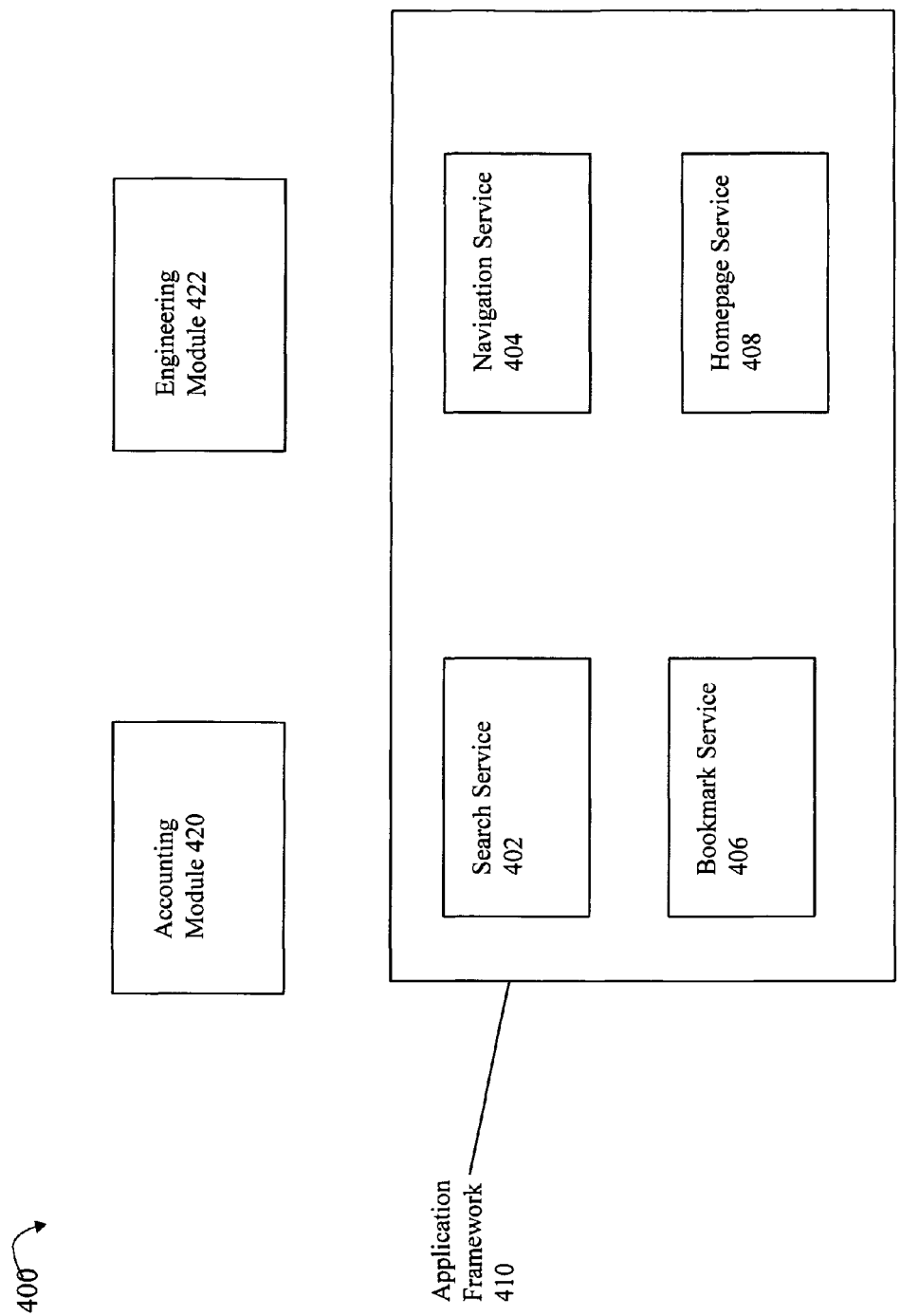
FIG. 6 is an example of software modules that may be used in an embodiment in accordance with techniques herein.

Referring to FIG. 6, shown are examples of components that may be included in an embodiment of a system in accordance with techniques herein. The example 400 may include an application framework 410 used with one or more plug-ins or application modules 420, 422. The application framework 410 may include a search service 402, a navigation service 404, a bookmark service 406 and a homepage service 408. Each of the modules 420, 422 may use one or more of the hierarchical structures as described herein such as in connection with FIG. 3. The hierarchical UI structures may be customized for each application and module's workflow. For example, module 420 may be first "plug-in" for tasks performed by accounting and a module 422 may be a second different "plug-in" for tasks performed by engineering. Each plug-in may have a different customized workflow and associated UI hierarchical structure using the same framework 410. The application developer may provide the UI hierarchical structure definition, content view information (or pointers to such information as used by the application modules to obtain such content view information), keywords associated with each content view, and a description for each content view to the framework 410 as part of registration information provided in connection with a content view registration process.

Referring to FIG. 7, shown is an example of registration information that may be provided to the application framework to register one or more content views for an application's UI content view hierarchical structure. The registration information 510 is represented as a table with a row for each content view to be registered. For each content view to be registered, the registration information 510 includes an address or node identifier 512, one or more keywords 514, a description 516 and a descriptor 518. The example 500 is one way in which the registration information may be provided in accordance with a format understood by the application framework components. Other formats and representations are possible.

The address or node identifier 512 identifies a path corresponding to a node identifier, address or location within the hierarchical structure of FIG. 3. Each content view has such a unique node identifier or address which may be further characterized as uniquely identifying a relative address or location within the UI content view hierarchy. The one or more keywords 514 identifies keywords associated with the UI content view of the row in 510. As described in more detail below, the keywords 514 associated with a particular UI content view identified in 512 of the same row facilitates UI content view searching. The description 516 provides an annotated description, such as for user viewing, about the content view. Descriptor 518 may be used in mapping the content view having address or node identifier of 512 to its content view information. The descriptor 518 may be, for example, a pointer to an object or structure including the content view information of FIG. 5E. The framework may use the descriptor 518 to obtain content view information of a selected content view to be displayed at a point in time.

It should be noted that the example 500 does not includes a complete set of registration information for all content views of the hierarchy of FIG. 3 and additional entries besides that of the example 500 are included consistent with previous explanation above.

Registering with the application framework may include registering with the search service 402 of FIG. 6 which creates and uses two tables from the registration information. The first table, denoted table 1, is illustrated in FIGS. 8A-8B and the second table, denoted table 2, is illustrated in FIG. 9.

With reference to FIGS. 8A-8B, table 1 630 created by the content view search service maps keywords to corresponding addresses or nodes in the hierarchical structure for associated content views. Table 1 630 includes an entry for each keyword in 632 and a list of one or more content view node addresses in 634 which are associated with the keyword. For example, row 602 is an entry for the keyword LUN which is specified in the registration information of FIG. 7 for all four of the LUNs A-D corresponding, respectively, to nodes 108a-108d of FIG. 3. Each of the address for nodes 108a-108d appear in column 634 of row 602. Similarly, table 1 630 includes a mapping between each keyword and the associated one or more content view node addresses. FIG. 8A includes a first portion of information that may be included in table 1 630, and FIG. 8B includes a second portion of information that may be included in table 1 630.

It should be noted that the examples 600, 650 do not specify a complete set of table 1 data for all keywords. Additional entries besides those of FIGS. 8A and 8B may be included for use in an actual embodiment consistent with previous explanation above.

With reference to FIG. 9, table 2 710 includes a mapping between the content view node addresses and associated descriptions. Table 2 710 includes an entry or row for each registered content view having an address or node identifier in the hierarchy in 712, an associated description in 714, and the content view's descriptor 716 (identifying or mapping to the content view information). As described in more detail below, the description 714 may be a text description presented to a user. The description 714 does not specify criteria to be used in connection with matching against user entered search terms but rather may be characterized as annotation provided to user for viewing. The keywords of table 1 are the search criteria matched against user search terms for content view searching.

With reference back to FIG. 6, the navigation service 402 uses an address or node identifier for a content view's node (e.g., element 712 of FIG. 9) to trigger a UI content view to be displayed. With the address identifier, the navigation service is able to either directly or indirectly trigger display of the desired content view. This is described in more detail below.

Additionally, each content view is registered with the content view search service 404 with registration information as described above which includes keywords and descriptions for registered content views. The search service 404 creates and maintains at least two tables of information for content views from the registration information. As described above, the first table (e.g., FIGS. 8A and 8B) stores keywords and associated content view node addresses. The second table (e.g., FIG. 9) stores the content view node addresses and associated descriptions. With the two tables, when a user types in a search term, techniques herein provide for matching the search term against keywords of registered content views, determining a list of any matching content views and displaying a list descriptions for the matching content views. A user selects a description from the displayed description list. In response to selecting a description, the search service 404 determines a content view address and descriptor associated with the selected description using the second table (table 2, FIG. 9). The content view address and associated descriptor are sent to the navigation service 402 which then triggers the content view to be displayed (e.g., by directly or indirectly retrieving and using for display the content view information of the descriptor associated with the selected description).

An embodiment may use the foregoing techniques to allow a user of an application module, such as any of modules 420 and 422 of FIG. 6, to perform a content view search without navigating through the series of UI selections to determine a desired content view. Consider, for example, completing registration for modules 420 and 422 with the registration framework as described above. Subsequently, a user of the module 420 starts execution of the application and wishes to search for a particular content view of interest. The user may be using the application for the first time and, by default, the user may be presented with a starting home page such as in FIG. 4A. However, the user may desire to modify his/her homepage to be another customized selected content view of particular interest to the user. As such, the user may use the techniques herein to locate the desired UI content view to be specified as the home page without requiring the user to manually navigate and perform an exhaustive manual search of UI content views.

Figure 10:
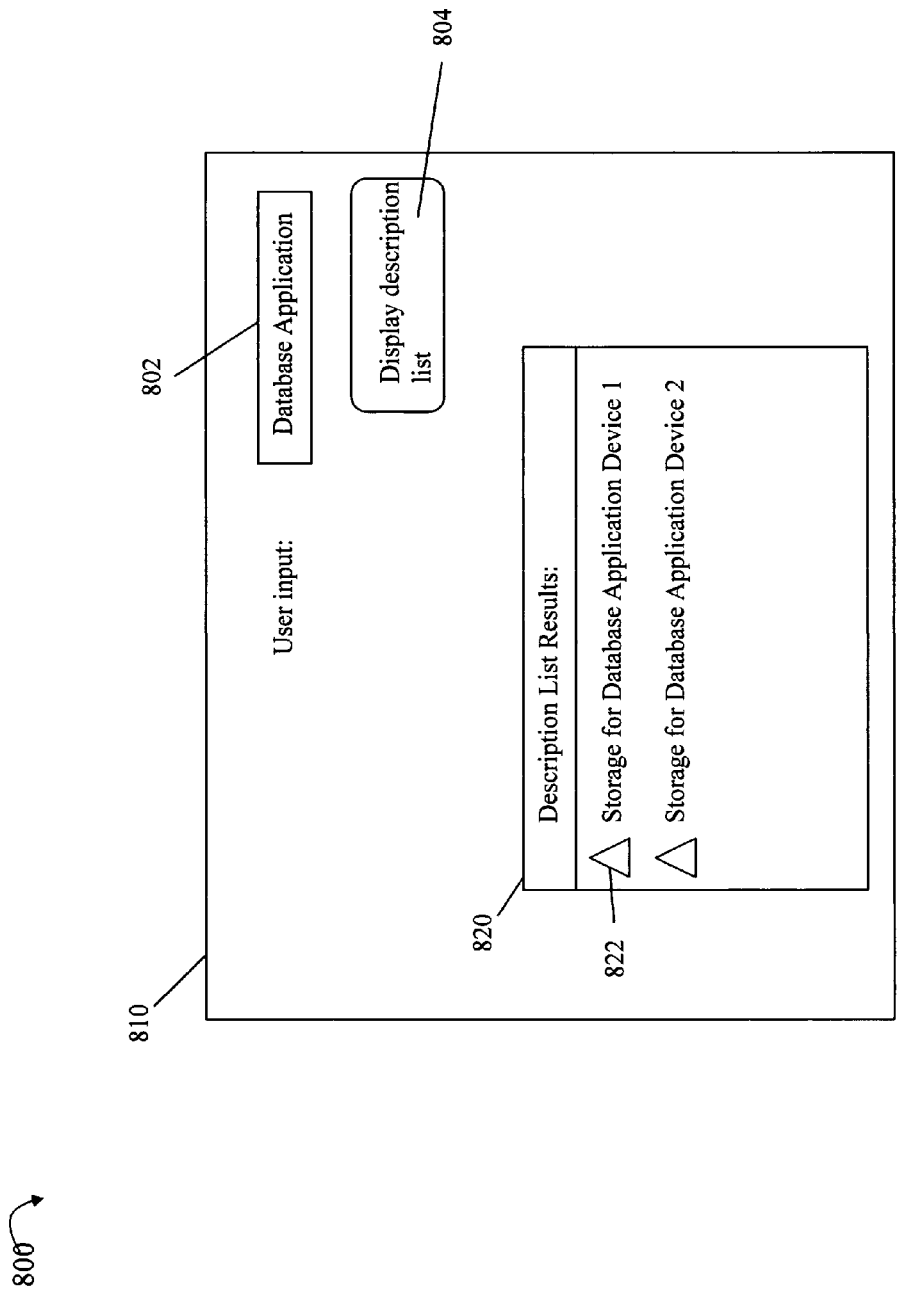

With reference to FIG. 10, shown is an example screenshot that may be displayed in connection with a user of an application module, such as any of modules 420 and 422 of FIG. 6. The screenshot 810 includes a location 802 for user input specifying one or more search terms. The user may enter one or more search terms in area 802. It should be noted that an embodiment may provide other ways for the user to enter search terms. For example, the user may specify 802 as a selection of one or more terms from a drop down menu or list of predefined terms. The list of predefined terms may include a list of currently defined keywords associated with content view as included in the registration information. Once the user has entered the one or more search terms as input in 802, the user may select button 804. In response to selecting 804, the search service 402 may be provided with the search terms. The search service 402 uses its tables to determine a list of content view descriptions to be displayed to the user. The search service may use the first table (e.g., table 1, FIGS. 8A, 8B) to determine one or more matches between user search term(s) of 802 and content view keywords. A list is created including content view addresses for those matches. The search service may then use the second table (e.g., table 2, FIG. 9) to determine, for each content view address, an associated description. In connection with the example of FIG. 10, the user has entered the search term "database application". Assume for purposes of illustration that the searching requires "database application" to match as an entity against a keyword (e.g., not to match database OR application but rather performs a search for an exact matching occurrence of "database application"). In this case, with reference to FIG. 8A, the search service uses its table 1 to determine a match to entry 610 which has two content view node addresses in column 634 identifying nodes 108a and 108b of FIG. 3. Using the two content view node addresses from column 634 and now with reference to FIG. 9, the search service then uses its table 2 to look up each content view node address. The search service determines that rows 720 and 722 match the foregoing two content view node addresses (e.g., determines a match between addresses in 634 of row 610 and column 712, rows 720 and 722 of table 2). The search service then displays a description list of results as in 820 including the descriptions of column 714 of rows 720 and 722. In response, the user may select one of the descriptions from the list 820. For example, the user may select 822. In response, the search service may provide the navigation service with the content view address or node identifier 712 and descriptor 716 in row 720 corresponding to the selected description 822. The navigation service may then trigger display of the desired selected UI content view having content view information identified by descriptor 716 of row 720. In this example, selection of 822 causes display of the content view of FIG. 5C. Thus, the user has selected a UI content view using the shortcut content view searching techniques described herein without having to manually navigate through a series of UI selections associated with different paths of the UI hierarchical structure to locate the desired UI content view found through the use of keyword matching. It should be noted that the techniques herein do not search the content or data displayed in the content view and do not search the description provided to the user in the displayed list 822. Rather, techniques herein match user search terms with keywords associated with a description and content view. The keywords may or may not be included in the description and may or may not be included in the actual content or data of the displayed content view. Thus, the keywords may be synonyms, broader categories, or related terms with respect to text of the description and/or content displayed. The use of keywords therefore provides added searching flexibility by allowing for an embodiment to specify and associate terms as keywords which may not appear in the content with the content view.

With reference back to FIG. 6, the selected UI content view may then be saved as a bookmark by a bookmark service 406 or as the user's new default home page by a home page service 408. The bookmark service 406 may allow a user to, for example, associate a selected content view with a bookmark icon or other UI element so that when the UI element is selected, the user navigates directly to the associated bookmarked UI content view without having to manually navigate through a series of UI selections. The user may save multiple frequently visited UI content views as bookmarks. The homepage service 408 may allow a user to define a default UI content view automatically displayed when the particular user logs into the application. The foregoing are just some services that may utilize the UI content view searching described herein.

Figure 11:
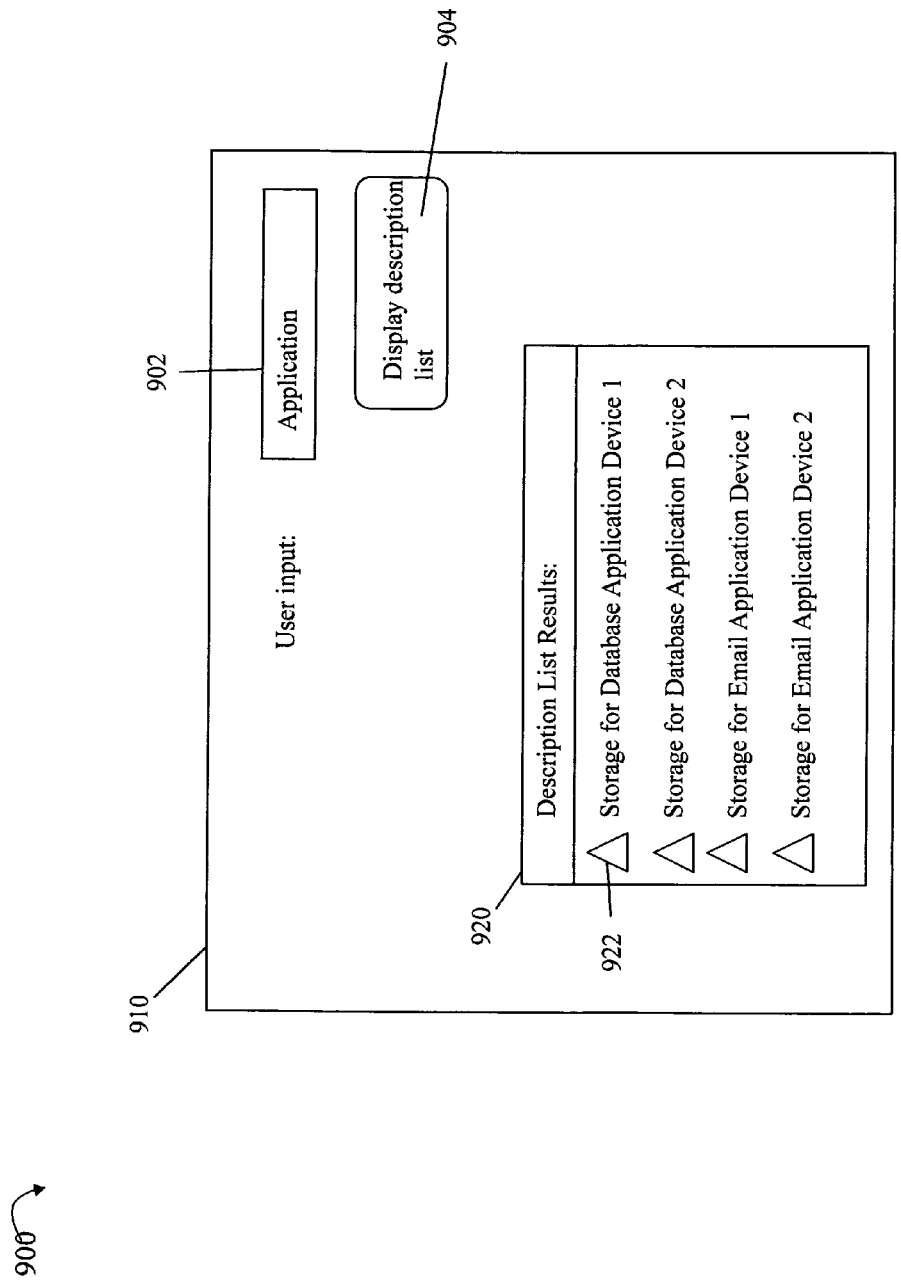

With reference to FIG. 11, shown is an example screenshot that may be displayed in connection with a user of an application module, such as any of modules 420 and 422 of FIG. 6. The screenshot 910 includes a location 902 for user input specifying one or more search terms. The user may enter one or more search terms in area 902 in a manner as described in connection with 802 of FIG. 10. Once the user has entered the one or more search terms as input in 902, the user may select button 904. In response to selecting 904, the search service 402 may be provided with the search terms. The search service 402 uses its tables to determine a list of content view descriptions to be displayed to the user. The search service may use the first table (e.g., table 1, FIGS. 8A, 8B) to determine one or more matches between user search term(s) of 802 and content view keywords. A list is created including content view addresses for those matches. The search service may then use the second table (e.g., table 2, FIG. 9) to determine, for each content view address, an associated description. In connection with the example of FIG. 11, the user has entered the search term "application". In this case, with reference to FIG. 8A, the search service uses its table 1 to determine a match to entries 610 and 612 since the term "application" appears in both "database application" of row 610 and "email application" of row 612. Rows 610 and 612 each have two different content view node addresses in column 634 identifying nodes 108a-108d of FIG. 3 (e.g. for LUNs A, B C and D). Using the four content view node addresses from column 634 and now with reference to FIG. 9, the search service then uses its table 2 to look up each content view node address. The search service determines that rows 720, 722, 724 and 726 match the foregoing four content view node addresses (e.g., determines a match between addresses in column 634 of rows 610 and 612 of table 1, and column 712, rows 720, 722, 724 and 726 of table 2). The search service then displays a description list of results as in 920 including the descriptions of column 714 of rows 720, 722, 724 and 726. In response, the user may select one of the descriptions from the list 920. For example, the user may select 922. In response, the search service may provide the navigation service with the content view address or node identifier 712 and descriptor 716 in row 720 corresponding to the selected description 922. The navigation service may then trigger display of the desired selected UI content view having content view information identified by descriptor 716 of row 720. In this example, selection of 922 causes display of the content view of FIG. 5C.

Figure 12:
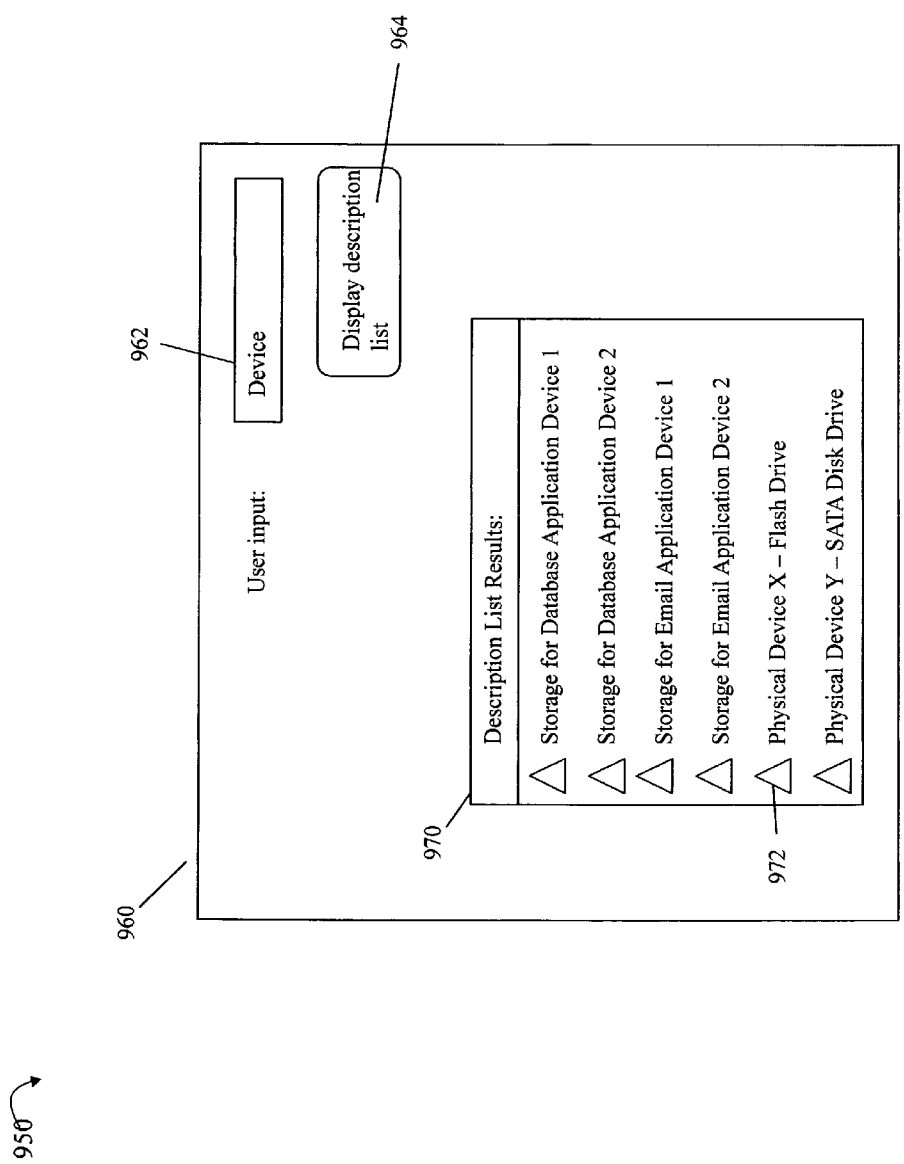

With reference to FIG. 12, shown is an example screenshot that may be displayed in connection with a user of an application module, such as any of modules 420 and 422 of FIG. 6. The screenshot 960 includes a location 962 for user input specifying one or more search terms. The user may enter one or more search terms in area 962 in a manner as described in connection with 802 of FIG. 10. Once the user has entered the one or more search terms as input in 962, the user may select button 964. In response to selecting 964, the search service 402 may be provided with the search terms. The search service 402 uses its tables to determine a list of content view descriptions to be displayed to the user. The search service may use the first table (e.g., table 1, FIGS. 8A, 8B) to determine one or more matches between user search term(s) of 802 and content view keywords. A list is created including content view addresses for those matches. The search service may then use the second table (e.g., table 2, FIG. 9) to determine, for each content view address, an associated description. In connection with the example of FIG. 12, the user has entered the search term "device". In this case, with reference to FIGS. 8A and 8B, the search service uses its table 1 to determine a match to entries 606, 608 and 662 since the term "device" appears in "storage device" (row 606), "logical device" (row 608) and "physical device" (row 662) keywords. Rows 606 and 608 have the same 4 LUNs and row 662 identifies two additional physical devices for a total of 6 different content view node addresses in column 634 identifying nodes 108a-108d of FIG. 3 (e.g. for LUNs A, B C and D) and node 114a, 114b of FIG. 3 (e.g., for PDs X and Y). Using the six unique content view node addresses from column 634 and now with reference to FIG. 9, the search service then uses its table 2 to look up each content view node address. The search service determines that rows 720, 722, 724, 726, 736 and 738 match the foregoing six content view node addresses (e.g., determines a match between addresses in column 634 of rows 606, 608 and 662 of table 1, and column 712, rows 720, 722, 724, 726, 736 and 738 of table 2). The search service then displays a description list of results as in 970 including the descriptions of column 714 of rows 720, 722, 724, 726, 736 and 738. In response, the user may select one of the descriptions from the list 920. For example, the user may select 972. In response, the search service may provide the navigation service with the content view address or node identifier 712 and descriptor 716 in row 736 corresponding to the selected description 972. The navigation service may then trigger display of the desired selected UI content view having content view information identified by descriptor 716 of row 736. In this example, selection of 972 causes display of the content view of FIG. 13.

Figure 14A:
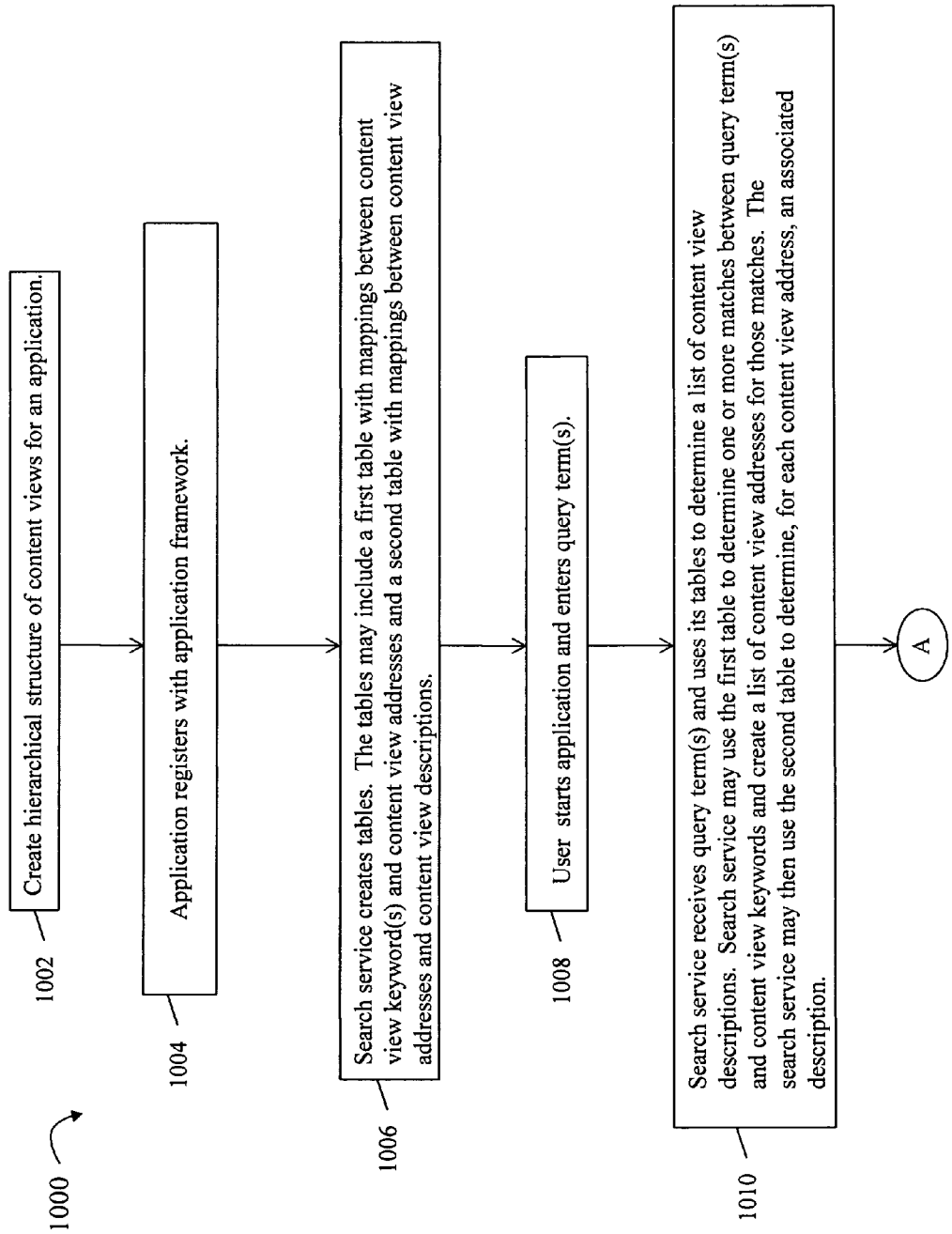
FIGS. 14A and 14B are flowcharts of processing steps that may be performed in an embodiment in accordance with techniques herein.
Figure 14B:
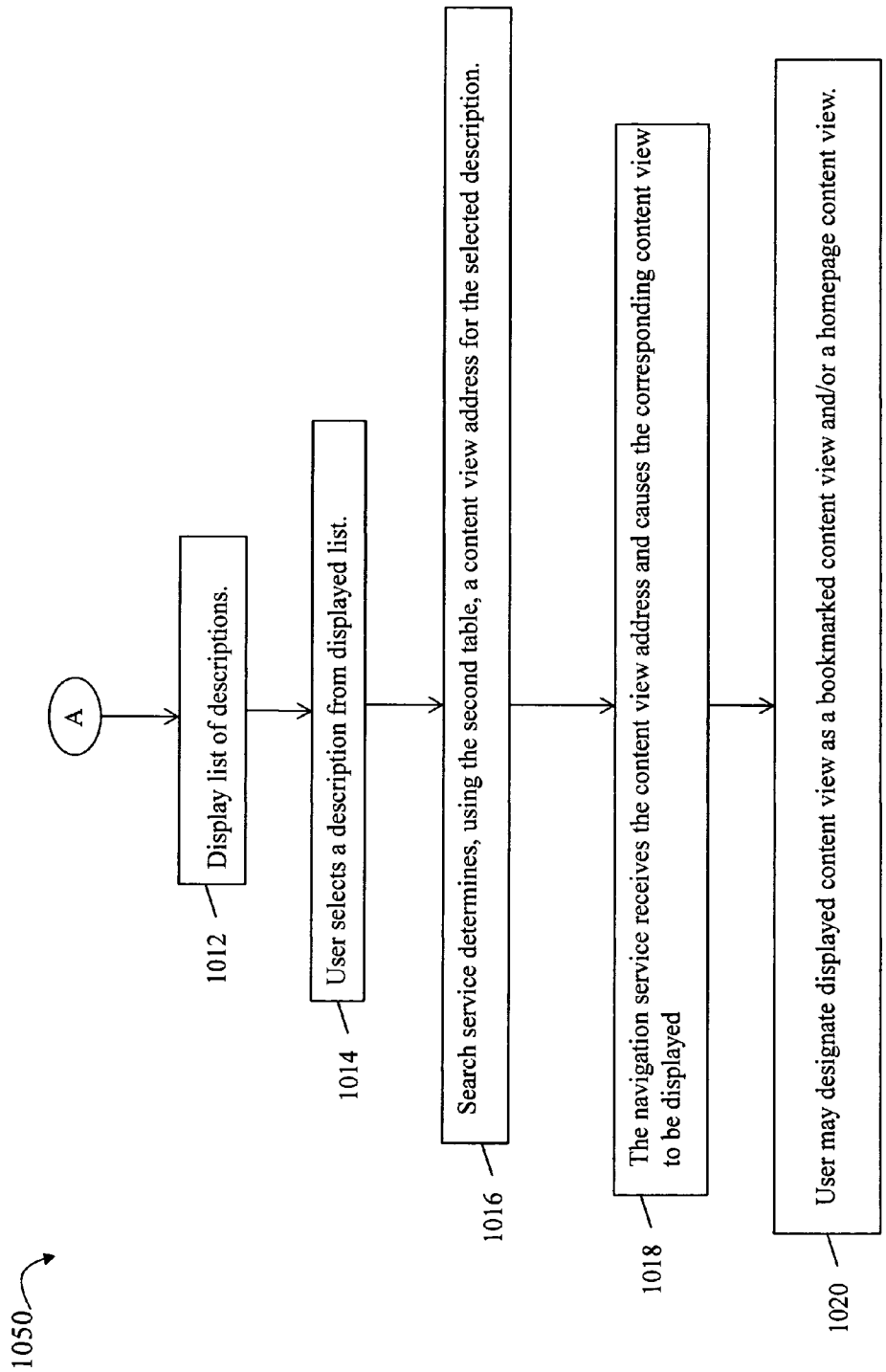

Referring to FIGS. 14A and 14B, shown are flowcharts of processing steps as may be performed in an embodiment in accordance with techniques herein. The flowcharts of FIGS. 14A and 14B summarize processing as described above. At step 1002, a hierarchical structure of UI content views is created for an application. At step 1004, the application registers its content views with the application framework. Registration of step 1004 may include providing registration information to the content view search service of the framework. Step 1004 may be performed at various times for the application. For example, registration of step 1004 with the framework may be performed in connection with application installation or the first time the application is invoked as a first initial step prior to executing code for the application. At step 1006, the search service of the framework creates tables used in connection with subsequently performing UI content view searching for registered content views of the application. The tables may include the first table as described above (e.g., FIGS. 8A, 8B) with mappings between content view keyword (s) and content view addresses and a second table also described above (e.g., FIG. 9) with mappings between content view addresses and content view descriptions. At step 1008, a user may start the application and enter search or query terms for performing the content view search. At step 1010, the search service receives query term(s) and uses its tables to determine a list of content view descriptions for display. The search service may use the first table to determine one or more matches between query term(s) and content view keywords and create a list of content view addresses for those matches. The search service may then use the second table to determine, for each content view address in the list, an associated description. At step 1012, the list of descriptions for matched content views from step 1010 is displayed. In step 1014, the user selects a description from the displayed list. In step 1016, the search service determines, using its second table, a content view address for the selected description from step 1014. In step 1018, the navigation service receives the content view address determined in step 1016 along with the corresponding descriptor of the content view information, and causes the corresponding content view for the selected description to be displayed. In step 1020, the user may designate the displayed content view as a booked content view and/or homepage content view.

An embodiment may implement the techniques herein using code executed by a processor. For example, an embodiment may implement the techniques herein using code which is executed by a processor of the data storage system, management system, or more generally, any computer system. As will be appreciated by those skilled in the art, the code may be stored on the data storage system on a computer-readable storage medium having any one of a variety of different forms including volatile and nonvolatile, removable and non-removable media implemented in any method or technology for storage of information such as computer readable instructions, data structures, program modules or other data. Computer-readable storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of performing a content view search comprising:

providing a hierarchical structure of content views, wherein the hierarchical structure comprises a plurality of nodes, each of said plurality of nodes corresponding to a different one of the content views representing a different user interface display, said plurality of nodes including a root node corresponding to a first user interface display, wherein a path from the root node to a second of the plurality of nodes corresponds to a series of user interface displays that are displayed in response to selecting a sequence of one or more user interface elements from one or more user interface displays of said series originating with selecting a first user interface element from the first user interface display, wherein each node of the hierarchical structure that is not a leaf node represents a corresponding content view for a user interface display that includes a user interface element for each child node of said each node and whereby selecting said each child node when said corresponding content view is displayed results in displaying another content view corresponding to said each child node;

registering the content views with an application framework, said registering including providing a plurality of instances of first information associated with the plurality of nodes, wherein each of the plurality of nodes representing a content view for a user interface display is associated with one of the plurality of instances of first information including content information identifying first data included in the user interface display, layout or representation information identifying aspects of how to layout or visually represent the first data in the user interface display, and child node link information identifying any child nodes of said each node and how to visually represent a user interface element in the user display for each of the child nodes;

receiving one or more query terms;

determining, by the application framework, one or more nodes in the hierarchical structure having an associated keyword matching the one or more query terms;

determining, by the application framework, a first list of one or more node identifiers identifying the one or more nodes in the hierarchical structure matching the one or more query terms;

determining, by the application framework, a second list of one or more descriptions, wherein said second list includes a description for each node identifier in said first list;

displaying the second list of descriptions;

responsive to a selection of a first description from the second list, determining a first node identifier corresponding to the selected first description; and displaying a first content view for the first node identifier, and wherein the hierarchical structure represents content views of a data storage management application, wherein the plurality of nodes of the hierarchical structure includes a first portion of nodes and each node in the first portion represents a logical device in a data storage system having a corresponding content view which includes logical device information, and wherein each node in the first portion is associated with a keyword identifying one of a plurality of applications, wherein the one application has its data stored on the logical device represented by said each node.

2. The method of claim 1, wherein said registering includes providing registration information to the application framework describing the hierarchical structure and the plurality of instances of the first information associated with the plurality of nodes, said registration information also including a description and a set of one or more keywords associated with each of said plurality of nodes.

3. The method of claim 2, wherein said determining one or more nodes in the hierarchical structure having an associated keyword matching the one or more query terms uses the registration information.

4. The method of claim 3, wherein the first list and the second list are determined by the application framework using the registration information.

5. The method of claim 1, further comprising:
associating the first node identifier with a bookmark for a first user.

6. The method of claim 5, further comprising:
displaying a first icon associated with the bookmark; and
displaying, in response to selecting the first icon, the first content view.

7. The method of claim 5, further comprising:
associating the first identifier with a home page for a first user, wherein, the first content view is automatically displayed as an initial user interface display for the first user in response to the first user executing an application, the application including user interface displays of content views represented by the hierarchical structure.

8. The method of claim 4, wherein a first set of one or more keywords is associated with the first node identifier for a first of the plurality of nodes in the hierarchical structure, wherein each of the keywords in the first set is not included in the first description for the first node and is not included in a content view for the first node, the first description being included in the second list and displayed and selected by a user.

9. The method of claim 1, wherein the application framework includes a search service that creates two tables using the registration information, a first of the two tables identifying, for each keyword associated with one of the nodes in the hierarchical structure, a first node identifier list identifying one or more nodes in the hierarchical structure and wherein each of the one or more nodes in the first node identifier list is associated with said each keyword, and a second of the two tables identifying, for each node in the hierarchical structure, a description associated with said each node, wherein said second table includes an entry for each node in the hierarchical structure.

10. The method of claim 9, wherein the first table includes at least one entry identifying a keyword associated with a plurality of nodes in the hierarchical structure.

11. The method of claim 1, wherein said hierarchical structure includes a plurality of nodes forming a tree having a root node and one or more descendant nodes of the root node.

12. The method of claim 11, wherein the tree includes a plurality of levels including a first level for the root node, a second level of nodes which are children or direct descendant nodes of the root node and a third level of nodes, said third level of nodes being children or direct descendant nodes of the second level of nodes.

13. The method of claim 12, wherein the one instance of first information for each node of the first level and each node of the second level having children at the third level includes child node information identifying one or more child nodes of said each node.

14. The method of claim 13, wherein, for a second node at the second level having the child node information, the child node information is displayed as part of a second content view of the second nod; and wherein the one instance of first information for the second node identifies how to display the child node information in a user interface display.

15. The method of claim 14, wherein the one instance of first information for the second node indicates to display the child node information as any of a user interface menu item for selection, a user interface button for selection and a user interface tab for selection.

16. The method of claim 15, wherein the hierarchical structure defines an application workflow.

17. The method of claim 1, wherein the layout or representation information identifies whether the first data is displayed in a table and describes table attributes including a table format, one or more table headers, a number of rows and a number of columns of the table, identifies what one or more portions of the table are bolded or italicized, and identifies a font for displaying information of the table.

18. The method of claim 1, wherein the one or more query terms identify an application and wherein the first list of one or more node identifiers identify one or more nodes of the first portion each representing a logical device providing storage for the application.

19. A non-transitory computer readable medium comprising code stored thereon for performing a content view search, the non-transitory computer readable medium comprising code, that when executed by a processor, performs a method comprising:
- providing a hierarchical structure of content views, wherein the hierarchical structure comprises a plurality of nodes, each of said plurality of nodes corresponding to a different one of the content views representing a different user interface display, said plurality of nodes including a root node corresponding to a first user interface display, wherein a path from the root node to a second of the plurality of nodes corresponds to a series of user interface displays that are displayed in response to selecting a sequence of one or more user interface elements from one or more user interface displays of said series originating with selecting a first user interface element from the first user interface display, wherein each node of the hierarchical structure that is not a leaf node represents a corresponding content view for a user interface display that includes a user interface element for each child node of said each node and whereby selecting said each child node when said corresponding content view is displayed results in displaying another content view corresponding to said each child node;
- registering the content views with an application framework, said registering including providing a plurality of instances of first information associated with the plurality of nodes, wherein each of the plurality of nodes representing a content view for a user interface display is associated with one of the plurality of instances of first information including content information identifying first data included in the user interface display, layout or representation information identifying aspects of how to layout or visually represent the first data in the user interface display, and child node link information identifying any child nodes of said each node and how to visually represent a user interface element in the user display for each of the child nodes;
- receiving one or more query terms;
- determining, by the application framework, one or more nodes in the hierarchical structure having an associated keyword matching the one or more query terms;
- determining, by the application framework, a first list of one or more node identifiers identifying the one or more nodes in the hierarchical structure matching the one or more query terms;
- determining, by the application framework, a second list of one or more descriptions, wherein said second list includes a description for each node identifier in said first list;
- displaying the second list of descriptions;
- responsive to a selection of a first description from the second list, determining a first node identifier corresponding to the selected first description; and
- displaying a first content view for the first node identifier, and wherein the hierarchical structure represents content views of a data storage management application, wherein the plurality of nodes of the hierarchical structure includes a first portion of nodes and each node in the first portion represents a logical device in a data storage system having a corresponding content view which includes logical device information, and wherein each node in the first portion is associated with a keyword identifying one of a plurality of applications, wherein the one application has its data stored on the logical device represented by said each node.

* * * * *